United States Patent [19]
Hatono et al.

[11] Patent Number: 5,914,936
[45] Date of Patent: Jun. 22, 1999

[54] ATM EXCHANGE PERFORMING TRAFFIC FLOW CONTROL

[75] Inventors: Atsuo Hatono; Tatsuo Mochinaga, both of Yokohama, Japan

[73] Assignee: Hitachi, Ltd., Tokyo, Japan

[21] Appl. No.: 08/857,114

[22] Filed: May 15, 1997

[30] Foreign Application Priority Data

May 16, 1996 [JP] Japan ..................... 8-121496

[51] Int. Cl.$^6$ .............................................. H04L 12/56
[52] U.S. Cl. ............................................ 370/230; 370/244
[58] Field of Search .................................. 370/230–238, 370/242, 244, 252, 395, 412

[56] References Cited

U.S. PATENT DOCUMENTS

| | | | |
|---|---|---|---|
| 5,359,320 | 10/1994 | Jaffe et al. | 370/448 |
| 5,457,687 | 10/1995 | Newman | 370/232 |
| 5,737,313 | 4/1998 | Kolarov et al. | 370/234 |

OTHER PUBLICATIONS

The Rate–Based Flow Control Framework for the Available Bit Rate ATM Service, IEEE Network, pp. 25–39 Mar./Apr. 1995, F. Bonomi and F.W. Fendick (see Specification p. 1).
The Institute of Electronics, Information and Communication Engineers Technical Report: The Society for Switching System, SSE 93–30 (1993–7), Natoshi Watanabe et al. (pp. 25–30).
ITU–T Recommendation 1.371 (pp. 1–90).
A Cell Loss Approximation Method Applicable for ATM Traffic of which Burst Lengths Are Subject to General Distribution: The Institute of Information Processing Article Record, vol. 36, No. 10, Oct. 1995, Hatono et al. (see Specification pp. 12–13).
Continuation, Probability Process Theory for Physical Engineering–Corona Company, pp.120–123, Hisano Ogura (see Specification p. 18).
In–Service Monitoring for Cell Loss Quality of Service Violations in ATM Networks, IEEE/ACM Transactions on Networking, vol. 4, No. 2, Apr. 1996 (pp. 240–248).

*Primary Examiner*—Min Jung
*Attorney, Agent, or Firm*—Kenyon & Kenyon

[57] ABSTRACT

An ATM exchange for performing the flow control adaptively in accordance with the seriousness of congestion, provided with a first threshold comparing circuit and a second threshold comparing circuit for comparing a cell queue length in a buffer of the exchange with a first and a second threshold, a timer counter which starts counting when the queue length exceeds the first threshold and is cleared to zero when the the queue length becomes smaller than the second threshold, a permissible time comparing circuit for comparing the count value with a permissible time, and a congestion counter for counting the output of the comparing circuit. The ATM exchange sets the first threshold, second threshold, and permissible time from the number of multiplexings of standard traffic, mean cell rate, peak cell rate, mean survival time of burst length, and false alarm probability, and judges that the heavy congestion is occurring when the queue length does not return to the second threshold or lower within the permissible time, and controls the flow of traffic, and at the same time, when this state continues, the flow restriction is enhanced depending on the elapsed time from the permissible time.

9 Claims, 21 Drawing Sheets

LIGHT CONGESTION

HEAVY CONGESTION

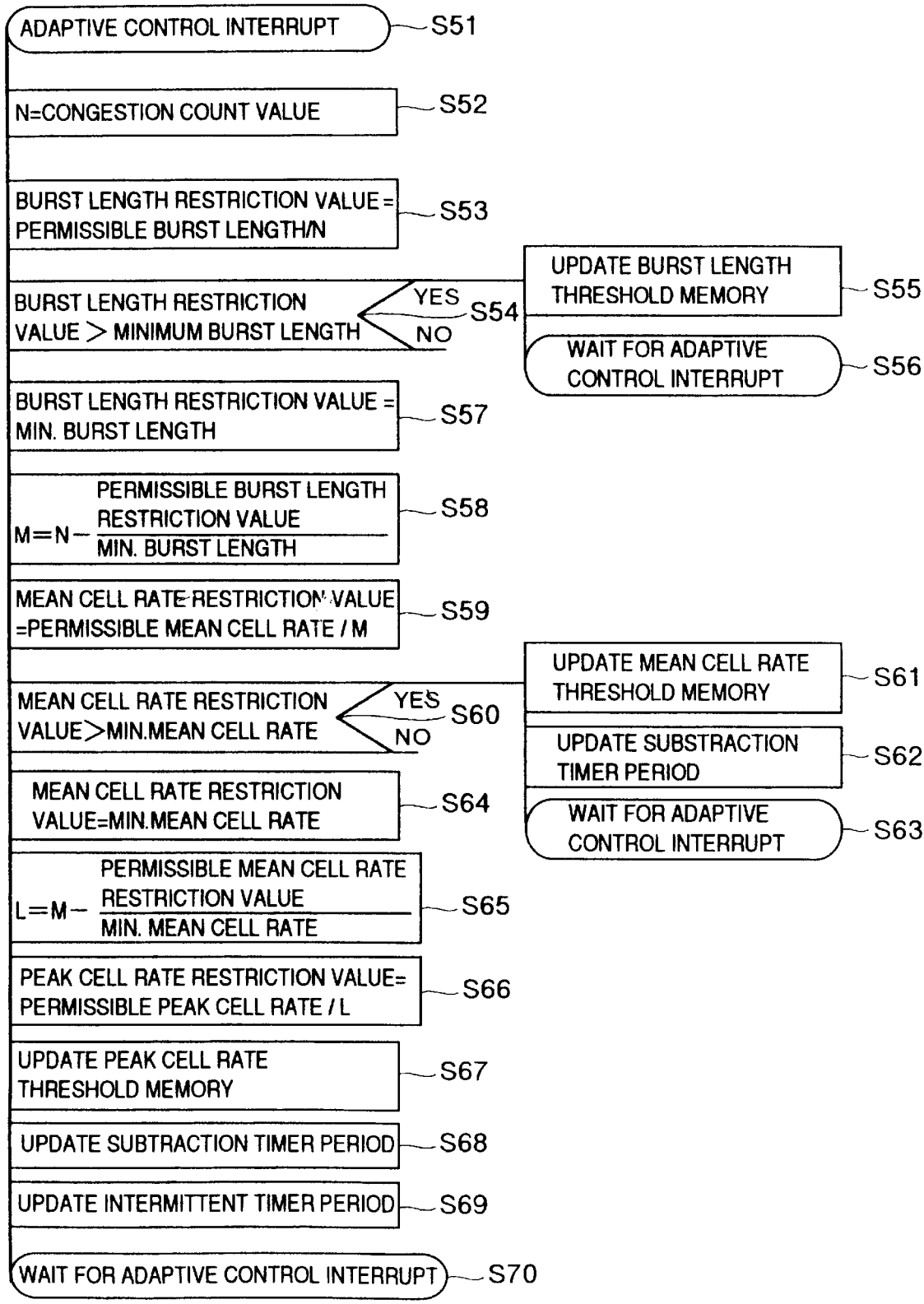

ATM EXCHANGE PERFORMING TRAFFIC FLOW CONTROL

CROSS-REFERENCE TO RELATED APPLICATION

This application relates to U.S. patent application Ser. No. 08/663,981 filed on Jun. 14, 1996 now U.S. Pat. No. 5,737,314 and assigned to the present assignee. The content of that application is incorporated herein by reference.

BACKGROUND OF THE INVENTION

1. Field of the Invention

The present invention relates to an ATM (Asynchronous Transfer Mode) exchange, and in particular, to an ATM exchange performing flow control of traffic by a feedback method.

2. Description of the Related Art

In ATM exchanges according to an prior art technique, for example, as describe in a document (F. Bonomi and K. W. Fendick, "The Rate-Based Flow Control Framework for the Available Bit Rate ATM Service", IEEE Network, pp 25–39, March/April 1995) etc., a method is employed in which every time a queue length of cells within a buffer exceeds a certain constant threshold, or when it is predicted to exceed the threshold, the feedback is applied.

Furthermore, as a modified example of the feedback method, it is proposed to apply the feedback when a maximum queue length within a constant time interval exceeds a threshold a plurality of times successively as shown in a document "Naotoshi Watanabe, Toshio Soumiya, Masafumi Katoh, Akira Nakata: The Institute of Electronics, Information and communication Engineers Technical report: The Society for Switching System: SSE93-30 (1993–7)".

In an ATM exchange according to a prior art technique, as shown in FIG. 2, a congestion control method using a trigger is employed in which every time the queue of cells within a buffer provided in the ATM exchange exceeds a constant threshold, or it is predicted to exceed, the feedback is applied to control the inflow. In other words, in the prior art control method, whenever the queue of cells existing within the buffer exceeds a certain threshold, even when the queue will be resolved naturally, the feedback is applied to activate the congestion control.

Now, the statistical behavior of queue lengths of cells caused within the buffer of the exchange can be regarded as the Markov process wherein the queue lengths of cells are probability variables. That is, as shown in FIG. 3, according to the theory of the Markov process, in the Markov process where a steady distribution exists, when a certain value of the probability variables is observed at time t=o, assuming that the drift coefficient is "1", at the point of time after a certain fixed time, for example, $t=1/128$ is elapsed, queue lengths are distributed with probability as shown by a curve B. similarly, it is known that the probability distribution after $t=1/2$ is elapsed, coincides almost with a steady distribution (curve F : t=infinitive).

Hereinafter, in the present specification, a required time until a probability distribution almost coincides with the steady distribution in the Markov process is described as a time constant.

The fact that a queue length of cells exceeds a threshold corresponds to that a certain value of the probability variables has been observed. Also, when a queue length does not recover the threshold or lower until the time constant elapses, this correspond to that a queue length exceeding the threshold has been produced in the steady distribution.

The threshold is assumed to be a queue length which seldom occurs in the steady distribution under a normal load. In this case, when the time constant elapses after the queue length exceeds the threshold, as far as the load is a normal load, it means that in most cases the queue length will recover the threshold or lower. For example, assuming that the threshold is a queue length which occurs at the rate of $1/10^4$ in the steady distribution, it will recover the threshold or lower at the rate of 99.99%.

In the congestion judging method according to the prior art technique employing the threshold trigger method, it is impossible to judge whether the detected congestion is light congestion which recovers naturally, or heavy congestion which requires feedback control.

In ATM exchanges, under a normal load, the light congestion caused by collision of bursts by chance occurs overwhelmingly, and in most cases the congestion recovers naturally.

Therefore, in the method according to the above-mentioned prior art technique wherein the feedback is applied regularly, since the feedback control is performed every time even to the light congestion which recovers naturally, a problem is involved in which the overhead is increased due to the traffic restriction, and the utilization rate of outgoing lines is lowered.

Furthermore, the control method described in the above-mentioned document, the switching system study society: SSE93-30(1993–7) which is effective in the case of statistically multiplexing random traffic is applied to an ATM exchange for statistically multiplexing burst traffic. In this control method, it is impossible to judge whether, as shown in FIG. 1A, the queue length exceeds a threshold intermittently in each observation period due to light congestion which recovers naturally, or as shown in FIG. 1B, heavy congestion is occurring wherein the queue length exceeds the threshold continually over the observation periods.

Accordingly, also in this control method, since the feedback control is performed eventually even against the light congestion which recovers naturally, the problem of the increase of the overhead due to the traffic restriction, and the lowering of the utilization rate of outgoing lines cannot be resolved.

On the other hand, the standardization of an ABR (Available Bit Rate) service is studied in the international standardization agency such as the ITU (International Telecommunication Union), etc. In the ABR service, the amount of traffic is adaptively controlled according to the seriousness of congestion of queue lengths of cells.

In order to realize this service, an ATM exchange is required which performs adaptive traffic control by feedback controlling the terminals connected thereto in accordance with the seriousness of congestion, and controlling the amount of traffic adaptively.

In order to perform the adaptive traffic control, it is indispensable to provide a function to judge the seriousness of congestion, and to determine the amount of feedback according to the seriousness of congestion. In particular, what is fatal to the ATM exchange is that, as shown in FIG. 1B, the occurrence of queue lengths exceeding the threshold continues.

Even if the queue length exceeds the threshold instantaneously, if the queue length recovers a value equal to or lower than the threshold within a sufficiently short period, it will be possible to reduce the cell loss probability to permissible cell loss probability or lower without performing the feedback control.

Accordingly, in order to realize the ABR service, it is necessary as a minimum requirement to judge whether the occurred congestion of queues is light congestion which recover naturally, or heavy congestion which requires feedback control.

SUMMARY OF THE INVENTION

The object of the present invention is to realize an ATM exchange which judges whether the congestion of cells occurred within a buffer in the ATM exchange is light congestion which recovers naturally, or heavy congestion which requires feedback control, and furthermore, controls the amount of traffic adaptively according to the seriousness of the congestion.

First, the principle for determining a permissible time for naturally recovering the congestion under a normal load will be explained.

As described in the foregoing, the statistical behavior of queue lengths of cells occurred within a buffer in the ATM exchange can be regarded as the Markov process having a probability variable represented by the queue length of cells.

According to the theory of the Markov process, in the Markov process where a steady distribution exists, it is known that when a certain value of the probability variable is observed, the probability distribution after a time constant almost coincides with the steady distribution.

When setting a first threshold and a second threshold having a value equal to or lower than the value of the first threshold, the fact that the queue length of cells exceeds the first threshold corresponds to that a certain value of the probability variable has been observed. Also, the fact that the queue length of cells does not recover the second threshold or lower until the time constant elapses corresponds to that a queue length exceeding the second threshold has occurred in the steady distribution.

This means that when the second threshold is set to a queue length which seldom occurs in the steady distribution under a normal load, and when the time constant elapses after queue length exceeds the first threshold, as far as the load is the normal load, in almost all the cases, the queue length will recover the second threshold or lower.

In other words, the probability that the queue length does not recover the second threshold or lower until the time constant elapses coincides with the probability of exceeding the second threshold in the steady distribution.

Accordingly, the permissible time for the congestion to recover naturally can be determined by performing transient analysis, with respect to queue lengths occurring within the ATM exchange, to obtain a probability distribution of queue lengths which are observed after an arbitrary time period from the time when a certain value of the probability variable is observed, and by obtaining the time constant.

When based on the principle mentioned above, it is possible to judge whether the congestion in queue occurred is light congestion which recovers naturally, or heavy congestion which requires feedback control by investigating whether or not the queue lengths return to a second threshold or lower which is smaller than or equal to a first threshold within a permissible time for the congestion to recover naturally under a normal load, after the queue lengths exceed the first threshold.

Also, the more the seriousness of the congestion, the longer becomes the delay for the queue lengths to return to a value of the second threshold or lower. Thus, the seriousness of the congestion can be determined by a length of time elapsed after the permissible time for the congestion to recover naturally.

Accordingly, the object of the present invention can be achieved by providing means for storing a first threshold and a second threshold smaller than or equal to the first threshold within a buffer queue in the ATM exchange, and a timer which is activated when queues exceed the first threshold and cleared to zero when the queues recover the second threshold or lower.

Furthermore, it is possible to judge, on the basis of the presence or absence of time-out, whether the congestion is light congestion which recovers naturally or heavy congestion which requires feedback control, and to judge the seriousness of the congestion by a length of elapsed time from the occurrence of the time-out.

On the basis of the above-mentioned means, in the present invention, the following functions are provided in the ATM exchange.

(1) For a buffer queue within the ATM exchange, a first threshold (ON threshold) 1, and a second threshold (OFF threshold) 2 which is equal to or smaller than the first threshold are provided, and queue lengths of cells are monitored.

(2) A timer is provided, which is activated when the queue lengths of cells in the buffer queue exceed the first threshold, and cleared to zero when the queue lengths recover the second threshold or lower.

(3) A time-out time is set to the timer.

Furthermore, a threshold setting function is provided, and from a peak cell rate, a mean cell rate, a mean burst length, and a dispersion of burst lengths of the traffic, and a outgoing line rate, the first threshold, the second threshold, and the permissible time are determined.

The ATM exchange judges that heavy congestion is occurring when queues do not recover the second threshold or lower within the permissible time and the time-out occurs, and performs feedback control of the terminals connected thereto, or performs flow restriction by a UPC (Usage Parameter Control).

Subsequently, when the queue lengths do not recover the second threshold or lower, it is judged that seriously heavy congestion is occurring, and the flow restriction is enhanced depending on the elapsed time from the permissible time.

By virtue of these series of processings, the ATM exchange which performs the flow control adaptively depending on the seriousness of the congestion can be realized.

BRIEF DESCRIPTION OF THE DRAWINGS

FIG. 22 is a PAD diagram showing an adaptive setting processing in the ATM exchange in which the present invention is applied to the UPC.

DESCRIPTION OF THE PREFERRED EMBODIMENTS

I. Principle

Figure 1A:
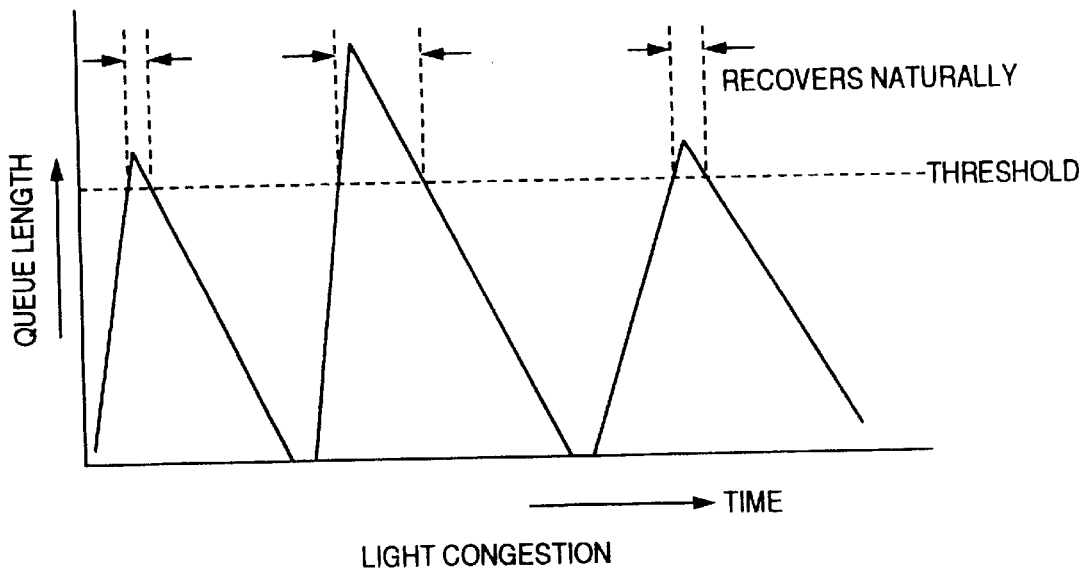
FIGS. 1A and 1B are diagrams useful to explain the difference between light congestion and heavy congestion.
Figure 1B:
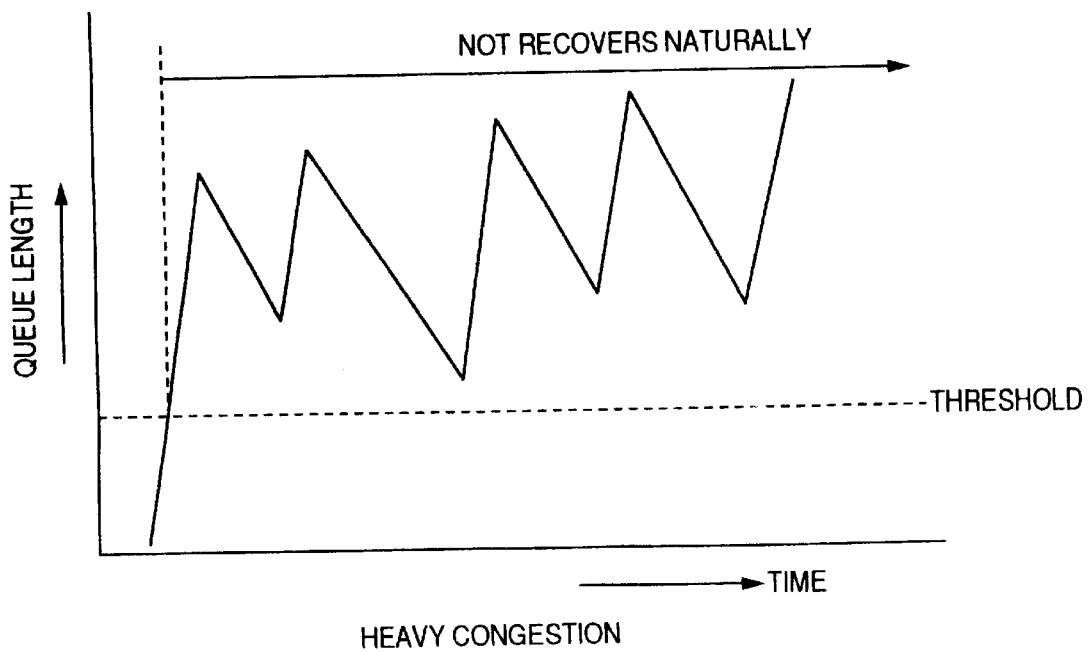
Figure 2:
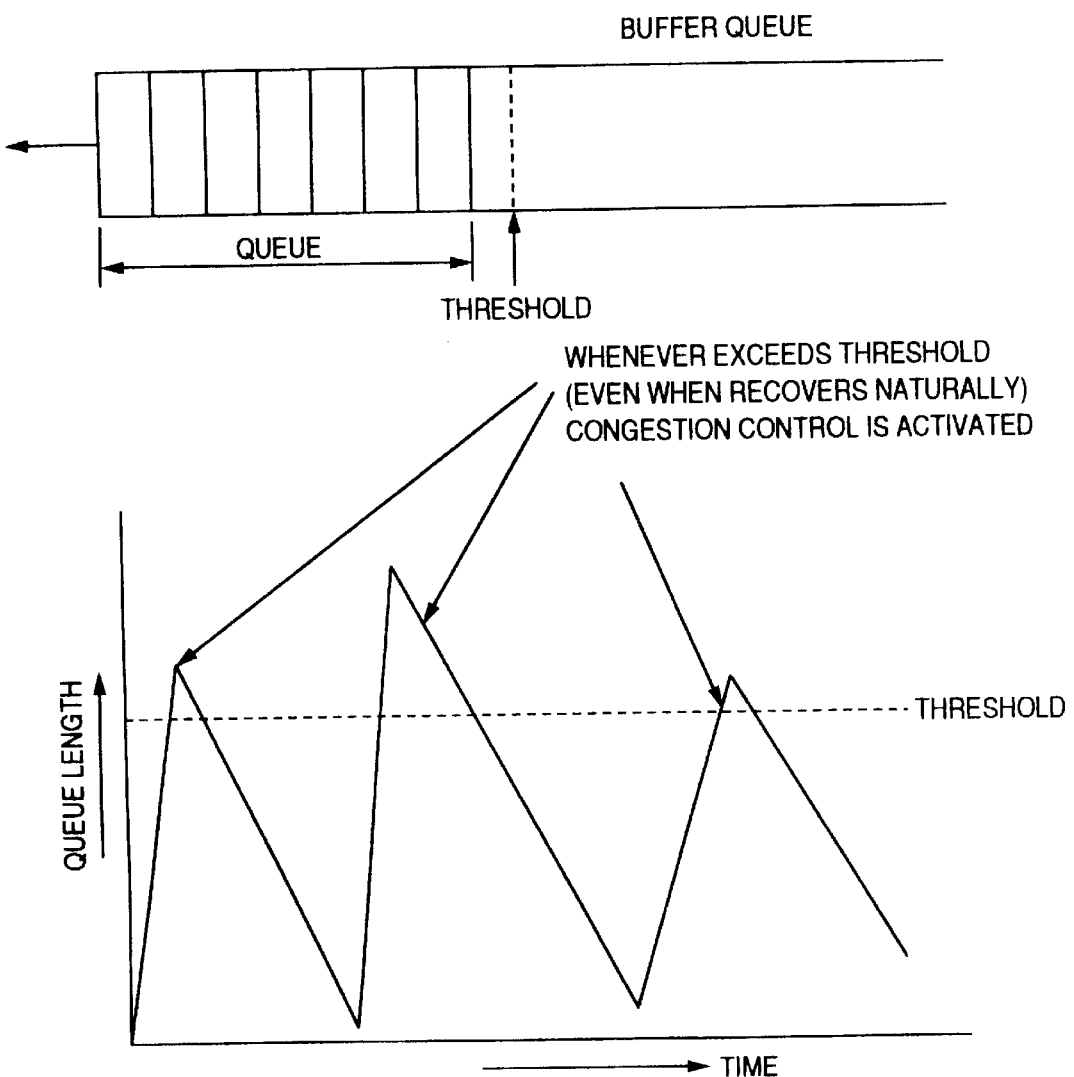
FIG. 2 is a diagram showing the outline of a threshold trigger method.

First, it will be explained as to the approximation theory for analyzing the time transition of a distribution function of queue lengths on which the present invention is based.

In the present embodiment, the approximation formula by an approach using a linear subspace and an orthogonal projection described in a document "Hatono, et al. : A Cell Loss Approximation Method Applicable for ATM Traffic of Which Burst Lengths Are Subject to General Distribution : The Institute of Information Processing Article Record, Vol.36, No.10, October 1995", in which document one of the inventors of the present application is participating, was expanded to multiple call kinds, and then the time transition was further expanded to describable approximation of the distribution function of queue lengths by a Green function convolution method.

The Green function convolution method is a method of approximating a general solution of a partial differential equation by a linear combination of the Green function which is a solution of a partial differential equation corresponding to a source (normally represented by $\delta$ function of Dirac). This method, heretofore, has been used as an approximation method in various fields of engineering, and it is called as a charge simulation method in the high voltage engineering, as an equivalent source method in the electromagnetic engineering, and as a body force method in the mechanical engineering.

In the case of analyzing a queue, heretofore, it was unable to solve a partial differential equation containing a term of time differential even in the most simple case of M/M/1 which is a queue model, and there was no approximation method which is effective to obtain a distribution function of queue lengths which can describe the time transition.

The present invention was realized by applying the Green function convolution method, for the first time, to the problem of queues due to burst traffic, and by enabling the approximation of a change in time of the distribution of queue lengths.

According to the document mentioned above, in the case where burst lengths are subject to a general distribution other than an exponential distribution, and burst intervals are subject to the exponential distribution, the steady distribution function P(x) of queue lengths due to burst traffic can be approximated by a linear primary combination of the exponential distribution as shown in the following equation 1.

$$P(x)=(\rho-P_s)\{0.4exp(-3\beta_o x)+0.6exp(-\beta_o x)\}+P_s\{0.4exp(-3\beta x)+0.6exp(-\beta x)\} \quad \text{(equation 1)}$$

Here, $P_s$ represents the probability that a queue of a burst level exists within a buffer, x represents the queue length, and $\rho$ represents the outgoing line utilization rate. $v_L$, $v_S$, $\epsilon$, $\eta$, can be represented, for each individual connection, by a mean cell rate, a peak cell rate, a mean of burst lengths, and a dispersion (a squared coefficient of variation of burst lengths) of burst lengths, and an outgoing line rate, and the number of connections. This will be described in detail later.

Also, $\beta$ represents the eigen value of a simultaneous ordinary differential equation shown in the following equation 2 which approximates a fluctuation of queue lengths of a burst level including $v_L$, $v_S$, $\epsilon$, $\eta$, as coefficients, and shown by the following equation 3.

$$v_L \frac{\partial y_L}{\partial x} = -\varepsilon y_L + \eta y_s \quad \text{(equation 2)}$$

$$-v_s \frac{\partial y_s}{\partial x} = \varepsilon y_L - \eta y_s$$

$$\beta = \left(\frac{\varepsilon}{v_L} - \frac{\eta}{v_s}\right) \quad \text{(equation 3)}$$

Here, $y_L$ (x) represents the density function when the queue lengths are extending, and $y_S$ (x) represents the density function when the queue lengths are contracting. $\beta_o$ represents the eigen value of a simultaneous ordinary differential equation shown in the following equation 4 which approximates a fluctuation of queue lengths of a cell level, and shown by the following equation 5.

$$v_{L,0} \frac{\partial y_{L,0}}{\partial x} = -\varepsilon_0 y_{L,0} + \eta_0 y_{s,0} \quad \text{(equation 4)}$$

$$-v_{s,0} \frac{\partial y_{s,0}}{\partial x} = \varepsilon_0 y_{L,0} - \eta_0 y_{s,0}$$

$$\beta_0 = \left(\frac{\varepsilon_0}{v_{L,0}} - \frac{\eta_0}{v_{s,0}}\right) \quad \text{(equation 5)}$$

When the approximation method of the abovementioned document is retrospectively applied to the Fokker-Planck theory, and the time transition is expanded to an approximation method of the distribution function of queue lengths which is describable, the simultaneous ordinary differential equation 2 becomes a simultaneous partial differential equation including a term of time differential as shown in the following equation 6.

$$-\frac{\partial y_L}{\partial t} + v_L \frac{\partial y_L}{\partial x} = -\varepsilon y_L + \eta y_s \quad \text{(equation 6)}$$

$$-\frac{\partial y_s}{\partial t} + v_s \frac{\partial y_s}{\partial x} = \varepsilon y_L - \eta y_s$$

Accordingly, when the Green function of the simultaneous partial differential equation 6 is superposed on the linear primary combination of equation 1 with the same weight, it is possible to obtain an approximation of the distribution function of queue lengths which can describe the time transition. The steady distribution of this time transition is coincident with equation 1.

This is the basic concept of the Green function superposing method in the problem of the queues due to burst traffic.

The above-mentioned simultaneous partial differential equation 6 cannot be solved analytically. However, the case where the cell loss probability poses a problem is such a case where a value of the cell loss probability is $1/10^4$ or larger. Thus, in the present invention, it is assumed that the probability flow is approximately preserved, that is, it is assumed that the probability flow is not changed with time, and the following equation 7 is set. Then, the above-mentioned simultaneous partial differential equation 6 becomes the following equation 8, and a cross differential term between the queue length and the time is eliminated.

$$\frac{\partial}{\partial t}\left(v_L \frac{\partial y_L}{\partial x} - v_s \frac{\partial y_s}{\partial x}\right) = 0 \quad \text{(equation 7)}$$

$$\frac{\partial^2 y_L}{\partial t \partial x} = 0, \quad \frac{\partial^2 y_s}{\partial t \partial x} = 0 \quad \text{(equation 8)}$$

Then, according to the above-mentioned document, since the probability density function of queue lengths is expressed by the following equation 9, the simultaneous partial differential equation can fall back, as shown in the following equation 10, to a backward diffusion equation having a drift. This fallback partial differential equation is, in the present specification, hereinafter, described as an equivalent diffusion equation.

$$y = y_L + y_s \quad \text{(equation 9)}$$

$$-\frac{\partial y}{\partial t} + \frac{v_L v_s \partial^2 y}{(\varepsilon+\eta) \partial x^2} + \frac{v_L v_s}{(\varepsilon+\eta)}\left(\frac{\varepsilon}{v_L} - \frac{\eta}{v_s}\right)\frac{\partial y}{\partial x} = 0 \quad \text{(equation 10)}$$

According to a document "Hisanao Ogura Continuation, Probability Process Theory for Physical Engineering : Corona Company", this fall-back equivalent diffusion equation represents the Brown motion having boundary conditions defined by a reflecting wall at the origin and a natural boundary at the point at infinity, and having a drift, and it can be solved easily.

The Green function of the Brown motion having the boundary conditions defined by the reflecting wall at the origin and the natural boundary at the point at infinity is expressed by the following equation 11.

$$y(x, z, t, \gamma, \sigma) = \quad \text{(equation 11)}$$

$$G(z - x - \gamma t, \sigma^2 t) + \exp(2\gamma t/\sigma^2) G(z + x + \gamma t, \sigma^2 t) -$$

-continued $$(2\gamma t/\sigma^2)\exp(2\gamma t/\sigma^2)\int_{(z+x+\gamma t)/\sigma\sqrt{t}}^{\infty} G(z, 1)dz$$

Here, y represents the density function of queue lengths, z represents the queue length after a time t, and G(a,b) represents the Gaussian distribution expressed by the following equation 12.

$$G(a, b) = \frac{1}{\sqrt{2\pi b}} \exp\left(-\frac{a^2}{b}\right) \quad \text{(equation 12)}$$

The first term of equation 11 becomes the following equation 13, and it shows that, in the physical sense, the center of gravity of the probability distribution moves to the point at infinity, and the dispersion is increased with time.

Furthermore, the second term of equation 11 becomes the following equation 14, and it shows that, in the physical sense, the center of gravity of the probability distribution moves to the origin, and the dispersion is increased with time.

Furthermore, the third term of equation 11 represents, in the physical sense, the balance of the drift towards the wall which has moved to the origin with the reflection.

$$G(z - x - \gamma t, \sigma^2 t) = \frac{1}{\sqrt{2\pi t}\,\sigma} \exp\left(-\frac{(z-x-\gamma t)^2}{\sigma^2 t}\right) \quad \text{(equation 13)}$$

$$G(z + x + \gamma t, \sigma^2 t) = \frac{1}{\sqrt{2\pi t}\,\sigma} \exp\left(-\frac{(z+x+\gamma t)^2}{\sigma^2 t}\right) \quad \text{(equation 14)}$$

In equation 11 to (equation 14), $\gamma$ represents the drift coefficient of an equivalent diffusion equation expressed by the following equation 15, and $\sigma^2$ represents the diffusion coefficient of an equivalent diffusion equation expressed by the following equation 16.

$$\gamma = \frac{v_L v_s}{(\varepsilon+\eta)}\left(\frac{\varepsilon}{v_L} - \frac{\eta}{v_s}\right) \quad \text{(equation 15)}$$

$$\sigma^2 = 2\frac{v_L v_s}{(\varepsilon+\eta)} \quad \text{(equation 16)}$$

Thus, in the present specification, a change with time of the distribution of queue lengths is approximated by the following equation 17 by superposing the Green function so that the steady distribution of queue lengths of a cell level coincides.

$$P(x, t) = \quad \text{(equation 17)}$$

$$(\rho - \rho_s)\{0.4y(x, z, t, \gamma_0, \sigma_0/3) + 0.6y(x, z, t, \gamma_0, \sigma_0) +$$

$$\rho_s\{0.4y(x, z, t, \gamma, \sigma/3) + 0.6y(x, z, t, \gamma, \sigma)\}$$

Figure 3:
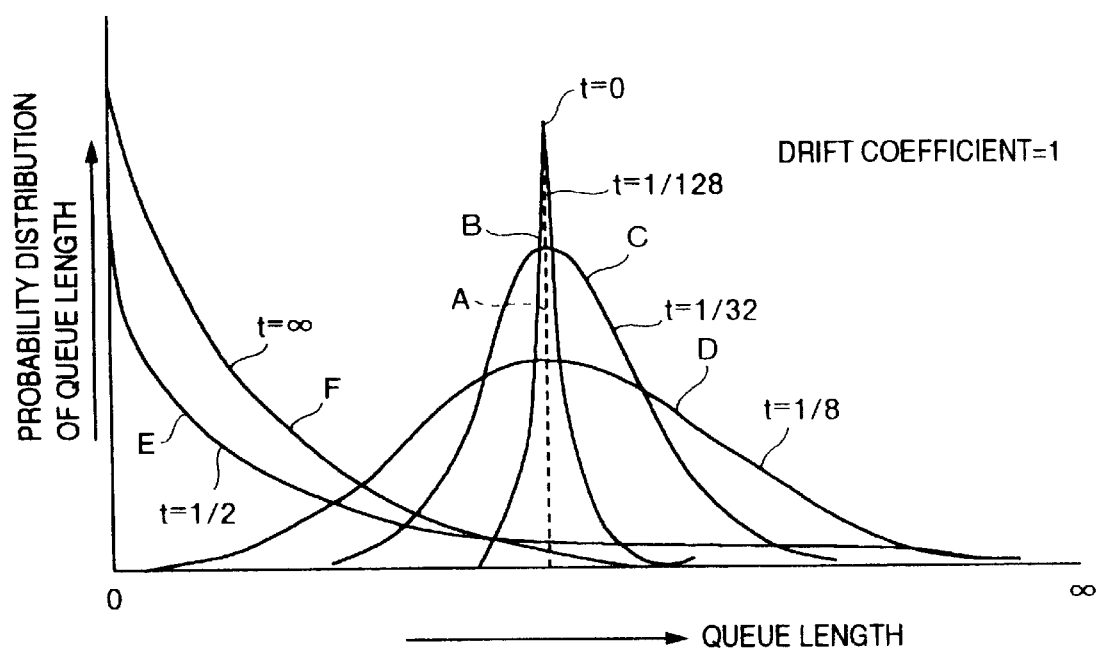
FIG. 3 is a diagram showing the time transition of a distribution of queue lengths.
Figure 4:
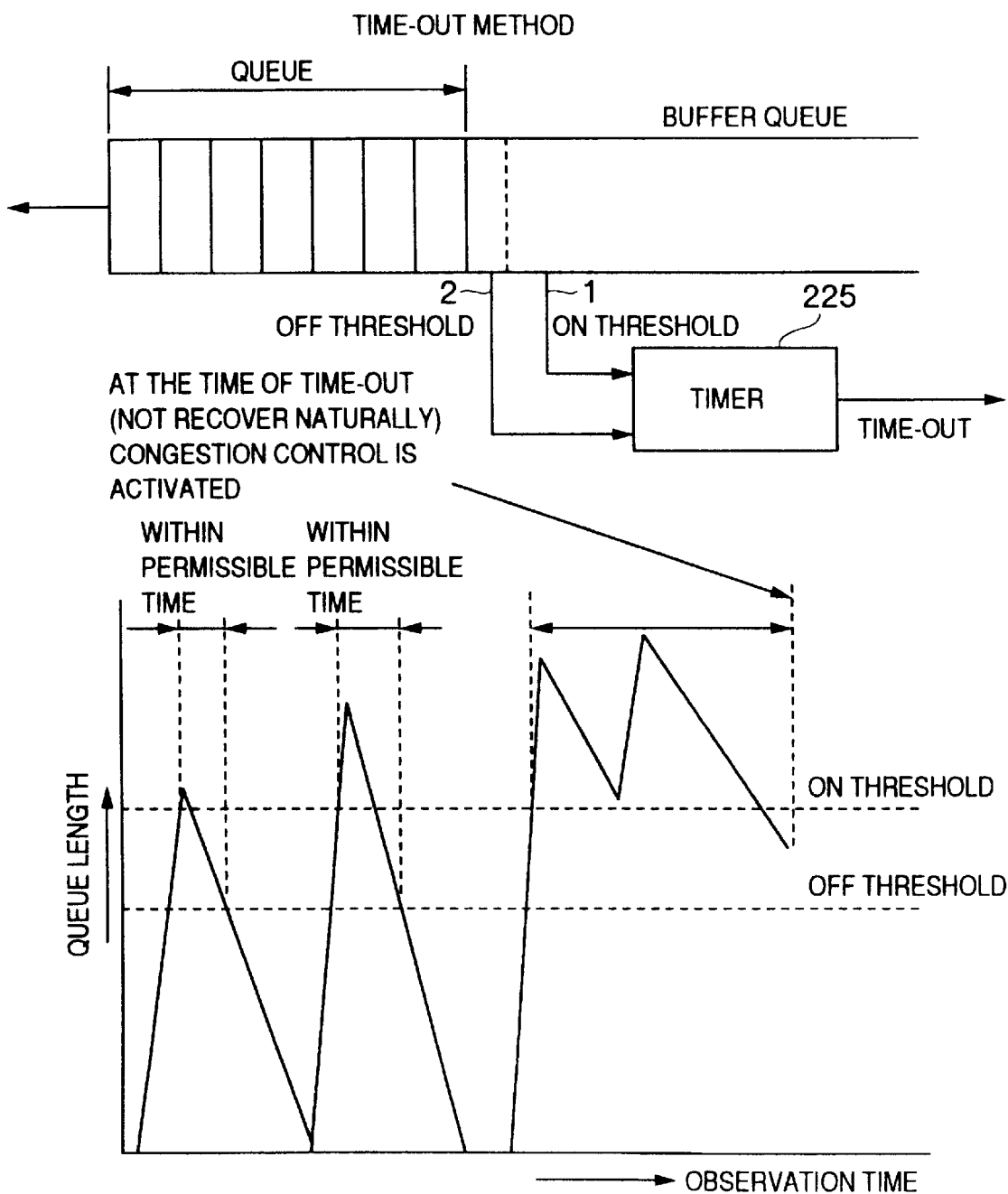
FIG. 4 is a diagram showing the outline of a time-out method.

Now, in this equation of the Green function equation 17, when time t exceeds a value of the drift coefficient equation 15, only the third term which represents the balance of the drift towards the wall with the reflection remains, and approaches the exponential distribution represented by the following equation 18, and shown by the curve F in FIG. 3.

$$P(x,t) = \beta \exp(-\beta x) \quad \text{(equation 18)}$$

This means, in the physical sense, that the drift towards the wall balances with the reflection and the steady distribution is formed.

Accordingly, when time t exceeds the value of the drift coefficient expressed by equation 15, the equation 17 almost coincides with equation 18 which represents the steady distribution.

Therefore, this means that when the time t from the point of time when the queue exceeds the threshold elapses the value of the drift coefficient expressed by equation 15, as far as under the normal load, in almost all the cases, the queue recovers the threshold or lower.

Thus, the heavy congestion can be detected by observing whether the queue recovers the threshold or lower within a time period corresponding to the value of the drift coefficient expressed by equation 15 from the point of time when queue exceeds the threshold.

The coefficients $v_L$, $v_S$, $\epsilon$, $\eta$, in the simultaneous differential equation 2 which approximates the fluctuation of the queue lengths of the burst level corresponding to the Green function of equation 1 can be represented, for each individual connection i, respectively by a mean cell rate $<v_i>$, a peak cell rate $v_i$, a mean burst length $\mu_i^{-1}$, and a squared coefficient of variation $C^2_i$ of burst lengths, and respectively expressed by the following equation 19, equation 20, equation 21, and equation 22.

$$v_L = \Sigma v_i - v \quad \text{(equation 19)}$$

$$v_S = v \quad \text{(equation 20)}$$

$$\varepsilon = \frac{\mu(\sum v_i)}{(1 - \sum \langle v_i \rangle / \sum v_i)} \quad \text{(equation 21)}$$

$$\eta = \mu \Sigma <v_i> \quad \text{(equation 22)}$$

Here, V represents an outgoing line rate. Also, $\mu^{-1}$ represents an effective mean burst length, and expressed by the following equation 23.

$$\frac{1}{\mu} = \frac{\sum \{(1 + C_i)/\mu_i\}\langle v_i \rangle (1 - \langle v_i \rangle / v_i)}{2\sum \langle v_i \rangle} \quad \text{(equation 23)}$$

In the above equation, $C^2_i$ represents the squared coefficient of variation burst lengths. Furthermore, the symbol $\Sigma$ having no suffix represents the summation relating to a connection.

Furthermore, the probability of existence of a queue of the burst level in the buffer is represented by the following equation 24.

In this equation 24, s represents the number of bursts which can be supported simultaneously by the outgoing line, and it is expressed by the following equation 25.

Here, [u] represents a Gaussian symbol, and represents a maximum integer which does not exceed u. a represents the amount of calls, and it is expressed by the following equation 26.

$$p_s = \frac{(a^s/s!)}{\sum_{i=0}^{s}(a^i/i!) + (a^s/s!)\frac{\rho}{1-\rho}} \quad \text{(equation 24)}$$

$$s = [V/v] \quad \text{(equation 25)}$$

$$a = (\Sigma <v_i>)/v \quad \text{(equation 26)}$$

In equation 25, and equation 26, v represents an effective peak cell rate, and it is expressed by the following equation 27.

$$v = \frac{\{\sum \langle v_i \rangle (v_i - \langle v_i \rangle)\}\{\sum v_i\}}{\{\sum (v_i - \langle v_i \rangle)\}\{\sum \langle v_i \rangle\}} \quad \text{(equation 27)}$$

Also, in equation 26, and equation 27, $\Sigma$ symbol having no suffix represents the summation relating to the connection.

The coefficients of the simultaneous differential equation 4 which approximates the fluctuation of the queue lengths of the cell level can be similarly expressed by the following equation 28, equation 29, equation 30, equation 31, and equation 32.

$$v_{L,0} = kV - V \quad \text{(equation 28)}$$

$$v_{s,0} = V \quad \text{(equation 29)}$$

$$\varepsilon = \frac{\mu_0 kV}{(1 - \sum \langle v_i \rangle / kV)} \quad \text{(equation 30)}$$

$$\eta = \mu_0 \sum \langle v_i \rangle \quad \text{(equation 31)}$$

$$\frac{1}{\mu_0} = \frac{\sum (1 - v_i/V)\langle v_i \rangle (1 - \langle v_i \rangle / V)}{2 \sum \langle v_i \rangle} \quad \text{(equation 32)}$$

In equation 29, and equation 31, k represents the number of all connections.

Also, in equation 28 to equation 32, $\Sigma$ symbol having no suffix represents the summation relating to the connection.

From the foregoing, by obtaining the summation $\Sigma<v_i>$ of mean cell rates of traffic of all connections, the summation of $\Sigma v_i$ of peak cell rates of all connections, the effective mean burst length $\mu^{-1}$ and the effective peak cell rate v from the mean cell rate $<v_i>$, the peak cell rate $v_i$, the mean burst length $\mu_i^{-1}$, and the burst length dispersion $C^2_i/\mu_i^2$ of permissible traffic of individual connection i, and by determining the probability (permissible false alarm probability) that the congestion is incorrectly judged, i.e. that the queue length exceeds the second threshold under the steady distribution, it is possible to determine the first threshold, the second threshold, and the permissible time for returning to the second threshold after exceeding the first threshold.

II. Embodiment 1

A first embodiment of the present invention will be explained with reference to the drawings.

Figure 5:
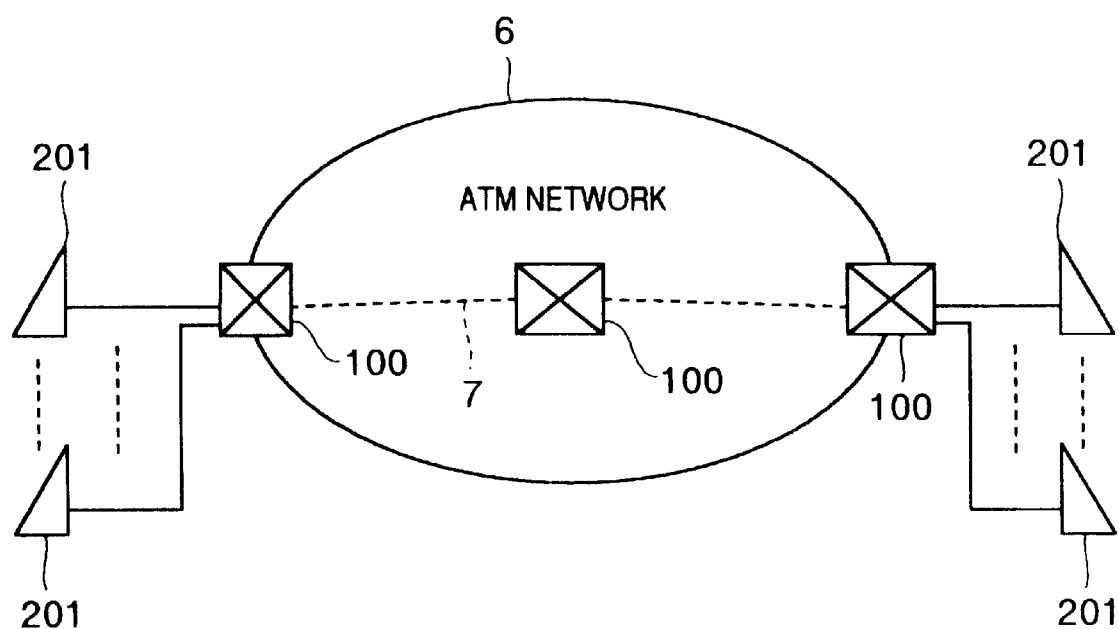
FIG. 5 is a conceptual diagram showing an ATM network to which the present invention is applied.

An ATM network, as shown in FIG. 5, constitutes an ATM network 6 by connecting through a transmission line 7 a plurality of ATM exchanges 100 each accommodating a plurality of terminals 201.

Figure 6:
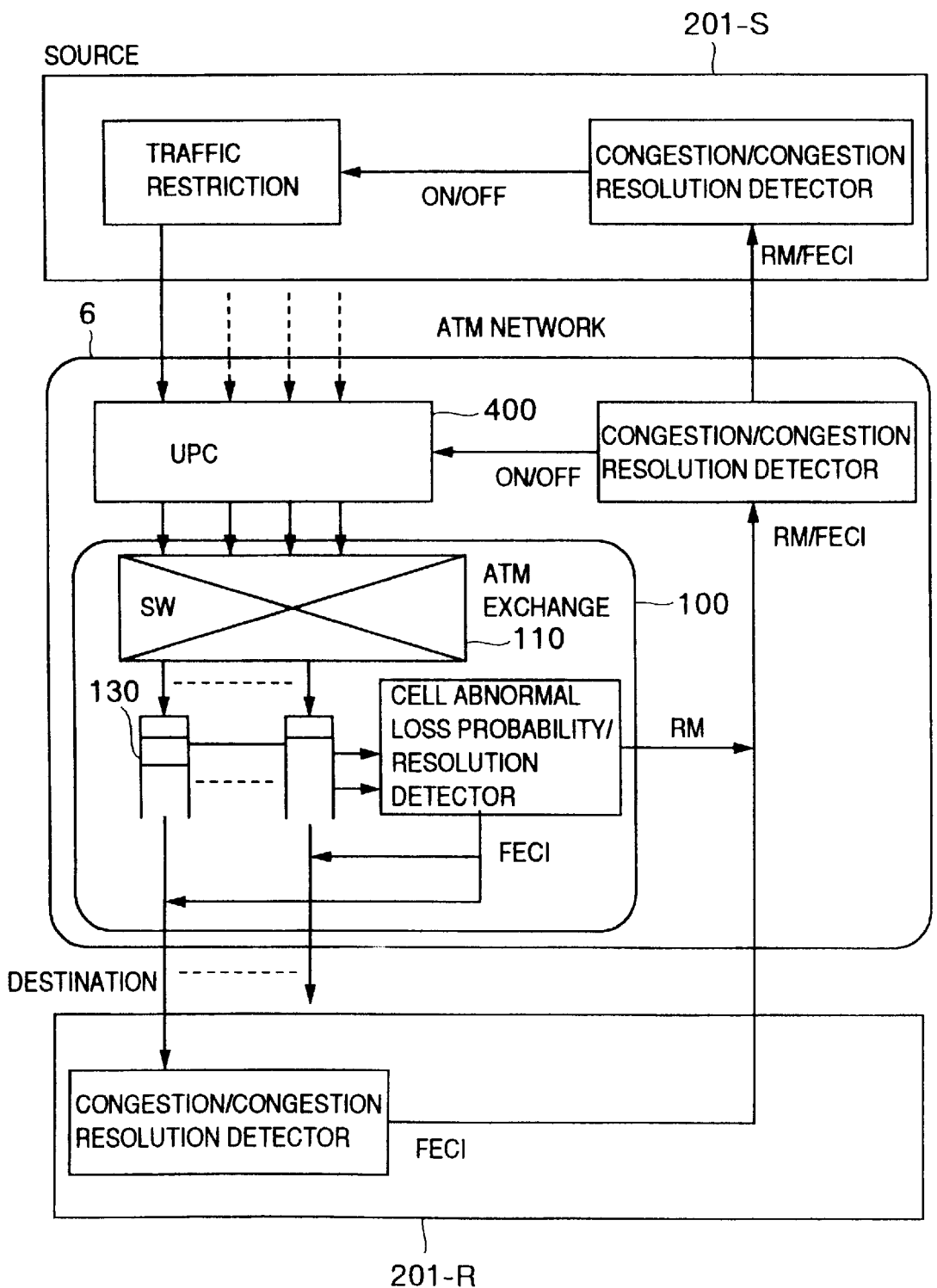
FIG. 6 is a conceptual diagram showing the outline of an ABR service in the ATM network.

A wide-area ABR service in a general ATM network is applied, as shown in FIG. 6, to a system in which an source terminal 201-S is connected to a destination terminal 201-R through the ATM network 6.

The ATM exchange 100 within the ATM network 6, temporarily stores cells flown into through a switching circuit (SW) 100 in buffer queues 130 corresponding to outgoing lines. A cell abnormal loss probability/resolution detector monitors cell queue lengths in the buffer queue 130, and on the basis of the result, a congestion/congestion resolution detector detects occurrence or resolution of congestion, and controls a traffic restriction function of a UPC (Usage Parameter Controller) within the ATM network or of the source terminal 201-S.

Furthermore, also in the destination terminal 201-R, a congestion/congestion resolution detector detects occurrence or resolution of heavy congestion, and controls the traffic restriction function of the UPC within the ATM network, or of the source terminal.

Figure 7:
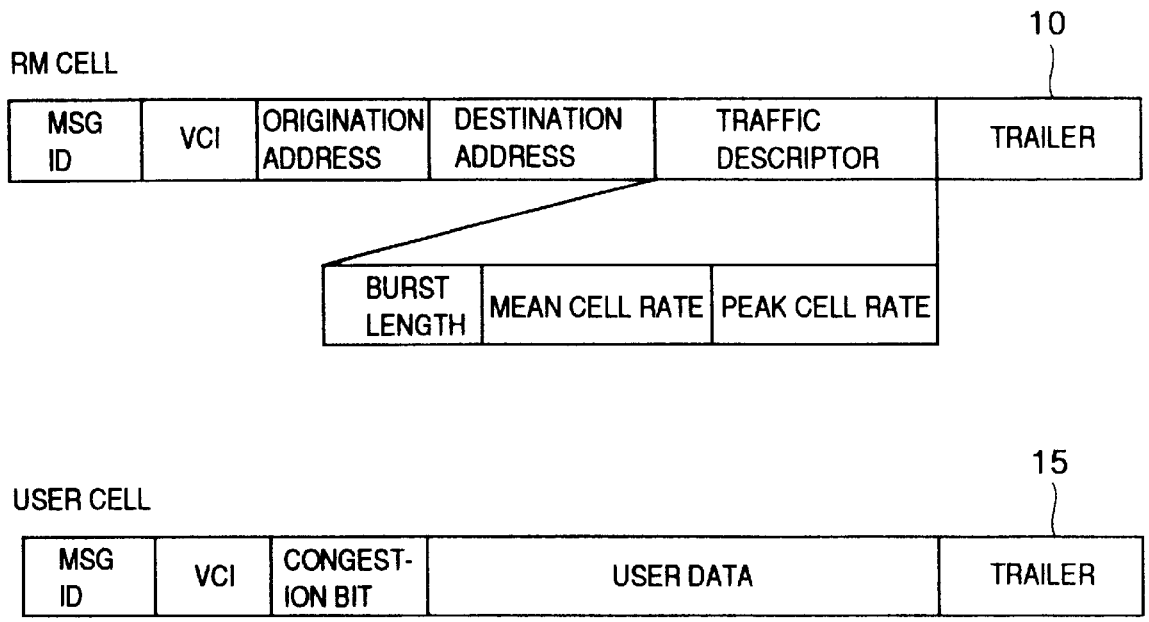
FIG. 7 is a diagram showing formats of cells in the ATM network.

FIG. 7 shows a structure of cells which flow through the ATM network. An RM (Resource Management) cell 10 is constituted by MSGID, VCI, an origination address, a destination address, a traffic describer, and a trailer.

The traffic describer is constituted by bits representing a burst length, a mean cell rate, and a peak cell rate.

A user cell 15 is constituted by MSGID, VCI, a congestion bit, user data, and a trailer.

The configuration and function of these cells, and a FECN (Forward Explicit Congestion Notification ) cell which will be described later are specified by the ITU-T Recommendation I.371.

Figure 8:
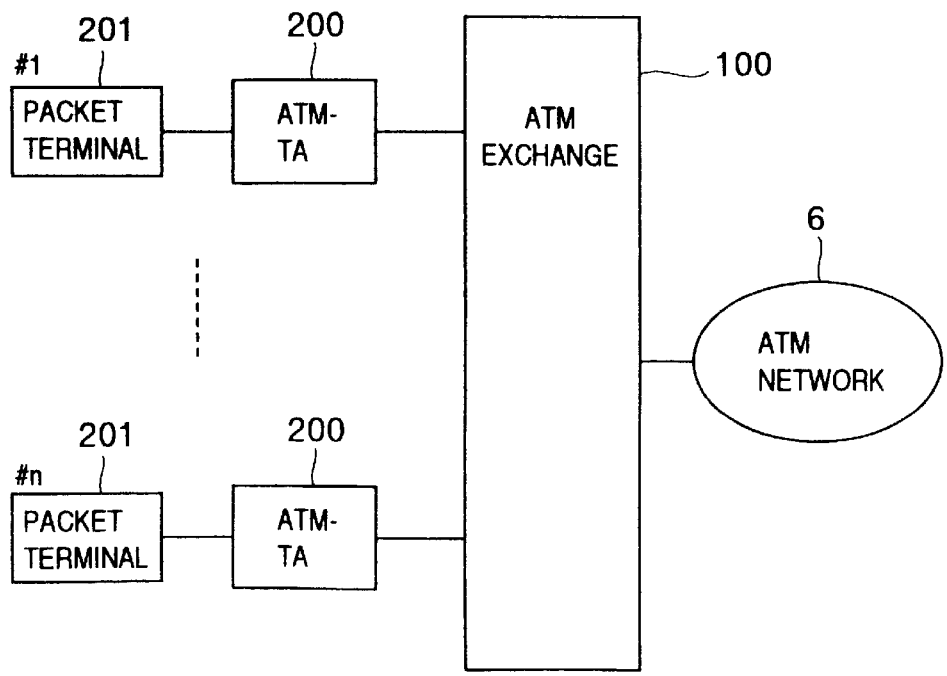
FIG. 8 is a diagram showing an adaptive form of the ATM network.

As shown in FIG. 8, when the adaptive control according to the present embodiment is applied to the ATM network, an ATM network terminal adaptor (ATM-TA) 200 is interposed between the ATM exchange 100 and the packet terminal 201.

When the occurrence of heavy congestion is detected by the ATM exchange 100, it transmits the RM cell 10 shown in FIG. 7 to the ATM-TA 200, the feedback control is performed on the packet terminal 201.

In the present embodiment, in the ATM-TA 200 which receives the RM cell 10, a burst length is changed by a burst division controller (described later) which sends cells intermittently, and a mean cell rate is changed by a packet readout delay circuit (described later) which delays the sending of the cells. Furthermore, in a CLAD (Cell Assembler Deassembler) which will be described later, a peak cell rate is changed. Owing to these series of operations, the ATM exchange is realized, which performs control by adaptively changing the burst length, mean cell rate, and peak cell rate of the traffic flowing into the ATM exchange.

1. ATM Exchange (1) Configuration

Figure 9:
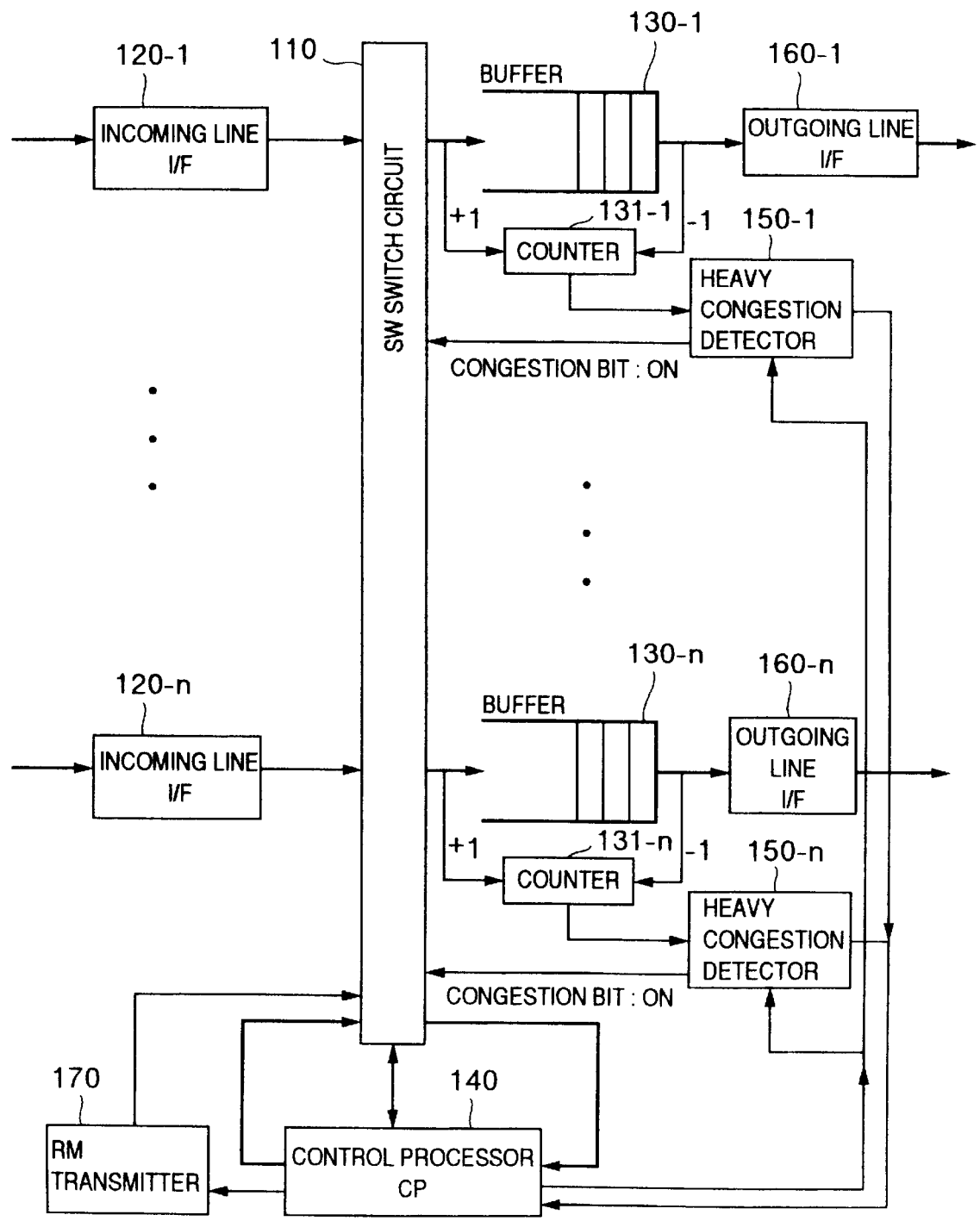
FIG. 9 is a diagram showing a configuration of an ATM exchange in the ABR service to which the present invention is applied.

The ATM exchange 100 shown in FIG. 9 is constituted, normally, by a switch circuit (SW) 110, a plurality of buffer queues 130-1 to 130-n, a control processor (CP: Control Processor) 140, a plurality of incoming line interface 120-1 to 120-n, and a plurality of outgoing line interface 160-1 to 160-n.

In addition to these components, there are provided with queue length counters 131-1 to 131-n for observing queue lengths of a cell level in respective buffer queues 130, a plurality of heavy congestion detectors 150-1 to 150-n for judging whether the queues of cells in the buffer queues are light congestion which recovers naturally, or heavy congestion which requires feedback control, and an RM transmitter 170 for requiring the ATM-TA 200 for traffic restriction.

The SW 110 performs a switching processing to distribute, in accordance with a VCI (Virtual Channel Identifier), the cells flowing thereinto to respective buffers 130 which are provided for respective outgoing lines.

Furthermore, the SW 110 has a function to rewrite the congestion bit to "1" in the header of each user cell shown in FIG. 7, when an FECN (Forward Explicate Congestion Notification) signal becomes ON state as prescribed in the ITU-I 371.

The buffer queue 130 has a function to buffer the collision of cells caused by the switching processing, and to send the cells to the ATM network 6.

Figure 10:
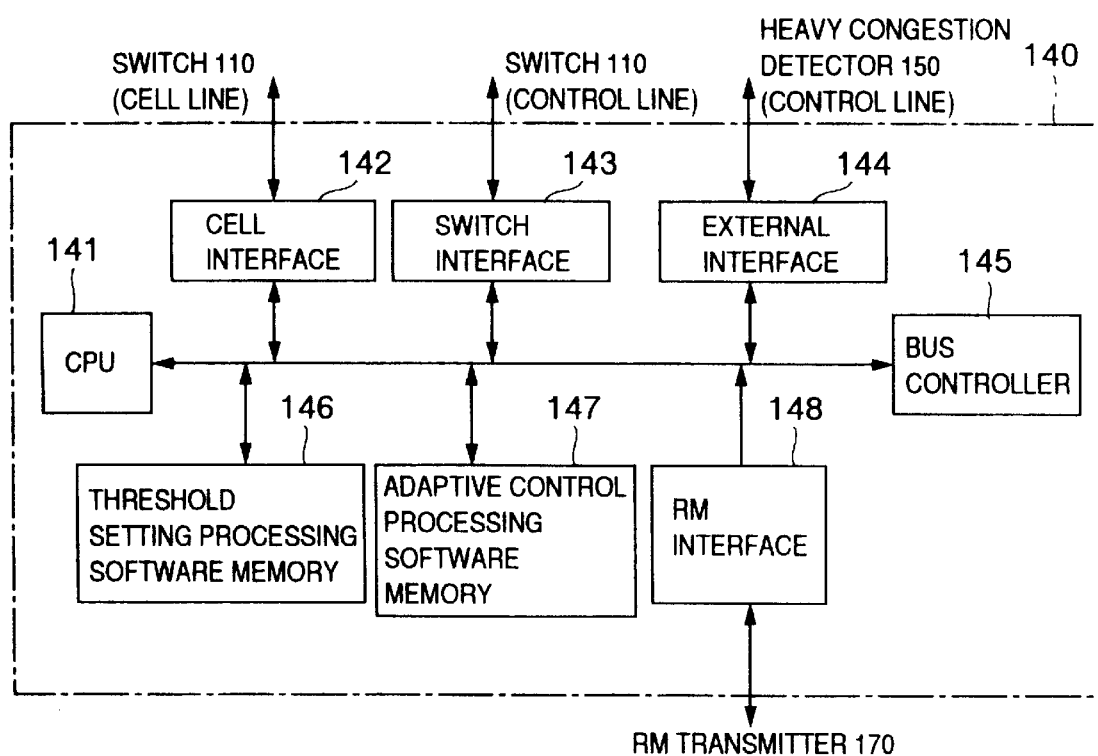
FIG. 10 is a diagram showing a configuration of a CP of the ATM exchange in the ABR service to which the present invention is applied.

FIG. 10 shows a configuration of the control processor CP) 140. The CP 140 includes a CPU (Central Processing Unit) 141, a cell interface 142, a switch interface 143, a threshold setting processing software memory 146, an adaptive control processing software memory 147, and an RM cell transmission interface 148, and these circuits are coupled by a bus controlled by a bus controller 145.

The heavy congestion detector 150 judges when congestion is occurred in the buffer 130, whether the congestion is light congestion which recovers naturally, or heavy congestion which requires feedback control.

Figure 11:
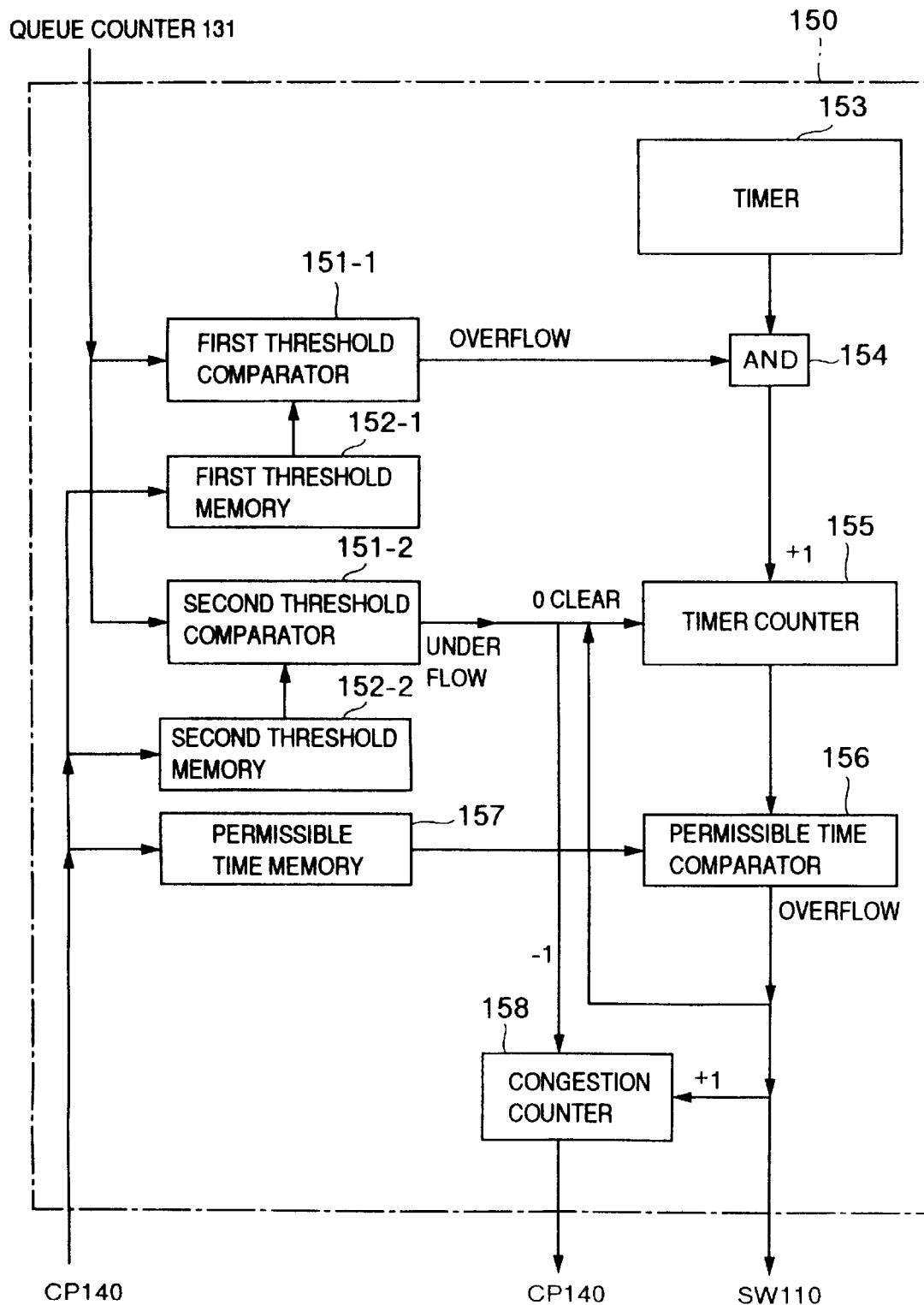
FIG. 11 is a diagram showing a configuration of a heavy congestion detector in the present invention.

As shown in FIG. 11, the heavy congestion detector 150 is constituted by a first threshold comparator 151-1, a first threshold memory 152-1, a second threshold comparator 151-2, a second threshold memory 152-2, a timer 153, an AND circuit 154, a timer counter 155, a permissible time comparator 156, a permissible time memory 157, and a congestion counter 158.

(2) Operation

With reference to FIG. 9, the operation of the ATM exchange 100 will be explained. At the time of activation of the ATM exchange 100, a threshold setting processing described later is performed, and a value of the first threshold and a value of the second threshold are respectively stored in the first threshold memory 152-1 and the second threshold memory 152-2 in the heavy congestion detector 150. Furthermore, by the threshold setting processing, a permissible time from the point of time when a queue length in the buffer exceeds the first threshold until the queue length returns to the second threshold is determined, and it is stored in the permissible time memory 157.

When the cells begin to flow into the ATM exchange 100, the SW 110 performs a switching processing, and stores the cells, in accordance with the VCI, in the buffer 130 provided for each outgoing line. When the cells flow into the buffer 130, the queue length counter 131 counts up each time one cell is stored, and counts down each time one cell is read out, and monitors the queue lengths of the cells in the buffer queue 130.

In the heavy congestion detector 150, a count value of the queue length counter 131 is inputted each time the count value is changed. The heavy congestion detector 150 checks when the count value is inputted whether the inputted count value does not exceed the first threshold.

When the count value from the queue length counter does not return to the second threshold or lower, the elapsed time from the point of time when the count value exceeds the first threshold is compared to determine whether the elapsed time has reached the permissible time. When the elapsed time has reached the permissible time, it is judged that the heavy congestion occurred, and a signal is sent to the SW 110 to activate the traffic restriction.

When the traffic restriction is activated, the SW 110 rewrites the congestion bit to "1" in the header of each cell. Furthermore, the SW 110 activates an adaptive control processing shown in FIG. 17, and determines a restriction value, and writes this restriction value to the RM cell. The RM cell written with the restriction value is transmitted to the ATM-TA 200, and the ATM-TA 200 asks the packet terminal 201 for the traffic restriction.

Next, the threshold setting processing will be explained in detail. In this processing, in accordance with the principle described in Chapter I, the thresholds, and the permissible time are calculated. The equations referred to hereinafter are those described in Chapter I. The threshold setting processing is realized by executing by the CPU 141 within the CP 140 the software stored in the threshold setting software memory 146.

Figure 16:
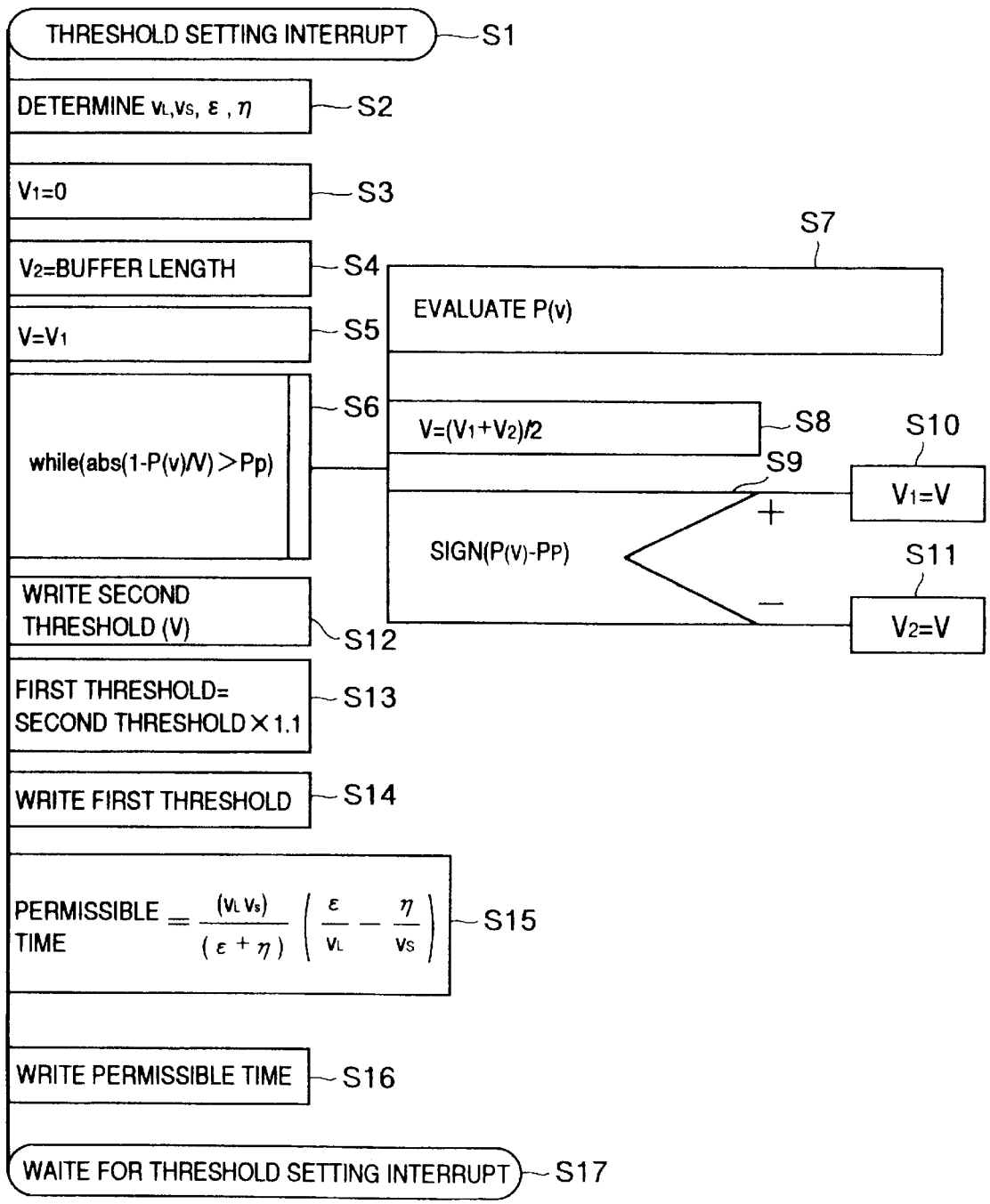
FIG. 16 is a PAD diagram showing a threshold setting processing in the ATM exchange to which the present invention is applied.

When the ATM exchange 100 is activated, the threshold setting processing shown in FIG. 16 is activated, and the threshold setting interrupt is executed, and the the threshold setting processing 1100 is started (S 1).

When the threshold setting processing 1100 is activated, the CP 140 reads a mean cell rate $<v_i>$, a peak cell rate vi, a mean burst length $\mu_i^{-1}$, and a burst length dispersion $C^2_i/\mu_i^2$ of permissible traffic of individual connection, which are preset, and obtains the summation of the mean cell rates, and the summation of the peak cell rates of the assumed all the connections.

Furthermore, by using equation 23, the effective mean burst length $\mu^{-1}$ is calculated.

After each mean burst length $\mu^{-1}$ is calculated, by using equation 19 to equation 22 and equation 28 to equation 32, the coefficients $v_L$, $v_S$, $\epsilon$, and $\eta$ of the simultaneous differential equations 2 and 4 which correspond to the Green function equation 11 are calculated.

Thereafter, in order to evaluate a relation between the false alarm probability and the queue length, the probability of existence of the queue of a burst level is calculated by using equation 25 to equation 27, and the parameters $\beta$, and $\beta_0$ of the exponential distribution are calculated by using equation 3 and equation 5 (S 2).

After calculating $\beta$, $\beta_0$, and $P_S$, the relation between the false alarm probability and the queue length is evaluated, and a value of queue length at which the false alarm probability becomes equal to or lower than a preset permissible false alarm probability $P_P$ is searched for by a bisection method.

Subsequently, "0" is set to a lower limit value $V_1$ of the queue length (S 3).

Furthermore, a buffer length is set to an upper limit value $V_2$ of the queue length (S 4).

A searched value of the value of queue length is set to V, and an initial searched value is set to "0" which is the lower limit value (S 5).

By equation 1, the probability at which the value of queue length overflows the searched value (V), that is, the false alarm probability $P_{(V)}$ is calculated (S 7).

A mean value $((V_2+V_1)/2)$ of the upper limit value $V_2$ and the lower limit value $V_1$ of the value of queue length is obtained as a new searched value V of the value of queue length (S 8).

By using the permissible false alarm probability $P_P$, and the searched value V obtained in the previous cycle, a difference between $P_{(V)}$ and $P_P$ is calculated (S 9).

When the difference is positive, the lower limit value $V_1$ of the value of queue length is set with a new searched value V (S 10).

When the difference is negative, the upper limit value $V_2$ of the value of queue length is set with a new searched value V (S 11).

These series of operations are repeated until the false alarm probability $P_{(V)}$ coincides with the permissible false alarm probability $P_P$ in a range of admissible error (S 6).

After the value V of queue length is determined, the value V of queue length is stored as the second threshold in the second threshold memory 152-2 of the heavy congestion detector 150 through the external interface circuit 144 (S 12).

The first threshold is set to a value (e.g. 10% larger) which is larger than or equal to the value of the second threshold (S 13).

After the value of the first threshold is determined, the value of the first threshold is stored in the first threshold memory 152-1 of the heavy congestion detector 150 through the external interface circuit 144 (S 14).

Thereafter, based on $v_L$, $v_S$, $\epsilon$, and $\eta$ which have been calculated, a drift coefficient $\gamma$ of the equivalent diffusion equation equation 16 is calculated, and $\gamma$ is made to be a value of the permissible time (S 15).

After the value of the permissible time is determined, the value of the permissible time is stored in the permissible time memory 157 of the heavy congestion detector 150 through the external interface 144 (S 16).

After these series of processings are completed, returns to wait for threshold setting interrupt (S 17).

The operation of the heavy congestion detector 150 will be explained with reference to FIG. 11.

In the heavy congestion detector 150, each time the count value of the queue length counter 131 is changed, the count value is inputted. When the count value is inputted, the first threshold comparator 151-1 compares the count value with the value stored in the first threshold memory 152. When the count value is larger than the stored value, each time a trigger is generated from the timer 153 which generates a trigger at a constant period, a value of the timer counter 155 is counted up by "+1".

Each time the count value of the timer counter 155 is changed, the permissible time comparator 156 compares the count value with a permissible time value stored in the permissible time memory 157. When the count value is larger than the stored value, the value of the congestion counter 158 is count up, so that a level of seriousness of congestion is raised, and at the same time, a signal for traffic restriction is sent to the SW 110. After the level of seriousness of congestion has been raised, the accumulated value of the timer counter 155 is cleared to zero.

Also, at the same time, the second threshold comparator 151-2 compares the count value with the value stored in the second threshold memory 152-2. When the count value is smaller than the stored value, the accumulated value of the timer counter 155 is cleared to zero, and the value of the congestion counter 158 is counted down by "−1", so that the level of seriousness of congestion is lowered.

Each time the count value of the congestion counter 158 changes, the interrupt to the CP 140 is occurred to activate the adaptive control processing, and to change the traffic restriction.

The adaptive control processing will be explained with reference to FIG. 17.

The adaptive control processing is realized by executing software stored in the software memory 147 by the CPU 141 within the CP 140.

Figure 17:
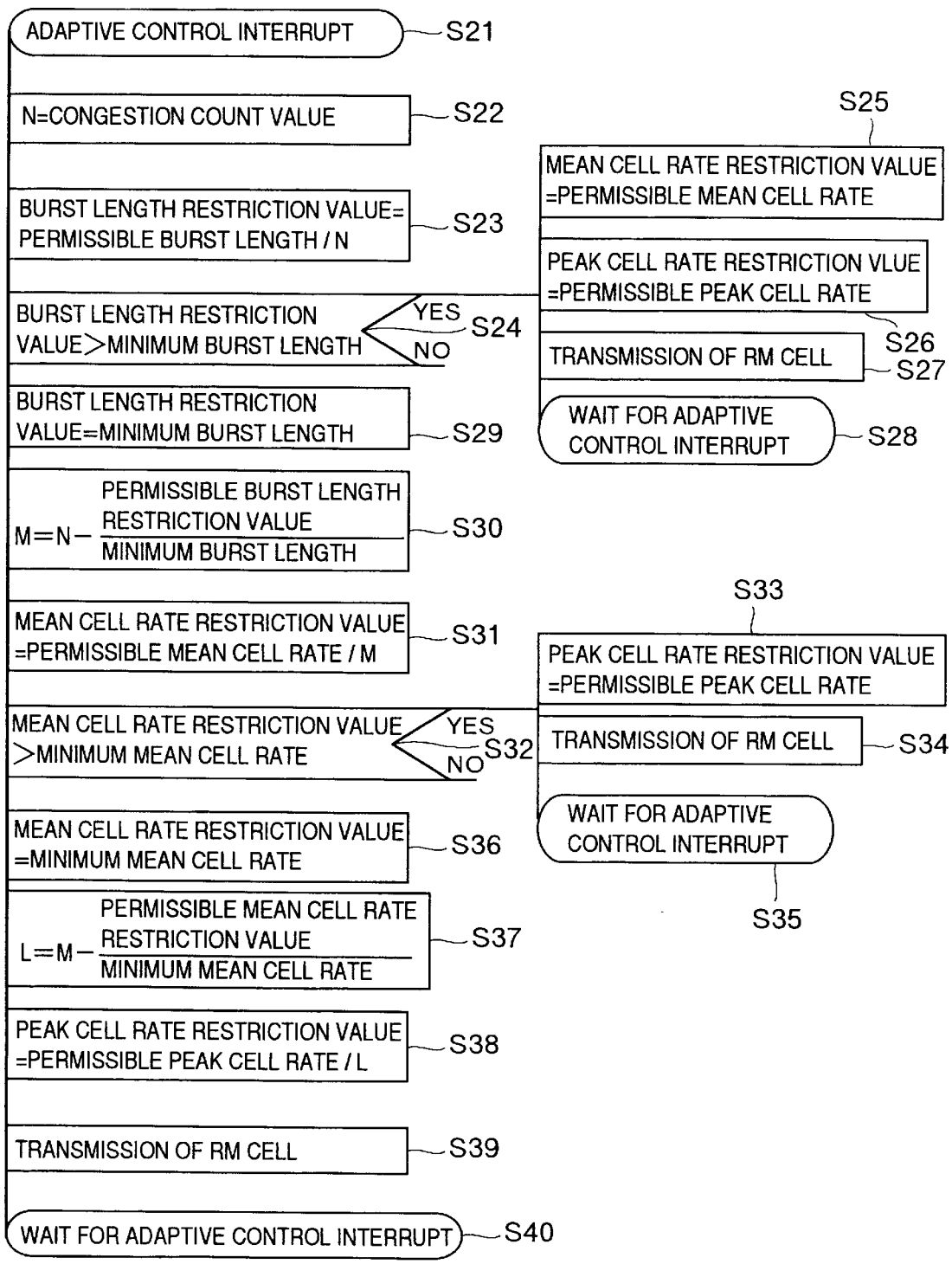
FIG. 17 is a PAD diagram showing an adaptive setting processing in the ATM exchange to which the present invention is applied.

When the heavy congestion detector 150 requests the interrupt to the CP 140 through the external interface 144, the adaptive control processing shown in FIG. 17 is activated (S 21).

When the adaptive control processing is activated, the CP 140 reads the value of the congestion counter 158, and substitutes its value for N (S 22).

When N is determined, the restriction value of the burst length is made to be 1/N of the preset permissible burst length (S 23).

Then, the restriction value of the burst length is compared with a value of preset minimum burst length (S 24).

When the restriction value of the burst length is larger than the value of the minimum burst length, the restriction value of the mean cell rate is made to be equal to a preset permissible mean cell rate (S 25), and the restriction value of the peak cell rate is made to be equal to a preset permissible peak cell rate (S 26).

When all the restriction values are determined, the restriction values are written to the RM cell, and asks the RM transmission 170 through the RM interface 148 for transmitting the RM cell (S 27). After asking for the transmission of the RM cell, returns to wait for adaptive control interrupt (S 28).

When a restriction value of burst length is smaller than the value of minimum burst length, the restriction value of burst length is set to a preset minimum burst length (S 29). The amount (restriction value of permissible burst length/set minimum burst length) is subtracted from N, and the result is made to be M (S 30).

When M is determined, the restriction value of mean cell rate is made to be 1/M of the preset permissible mean cell rate (S 31).

Subsequently, the restriction value of mean cell rate is compared with a value of preset minimum mean cell rate (S 32).

When the restriction value of mean cell rate is larger than the minimum mean cell rate, a restriction value of peak cell rate is made to be the preset permissible peak cell rate (S 33). When all the restriction values are determined, the restriction values are written to the RM cell, and asks for transmission of the RM cell through the RM interface 148 (S 34). After asking for the RM cell transmission, returns to wait for adaptive control interrupt (S 35).

When the restriction value of mean cell rate is smaller than the minimum mean cell rate, a restriction value of mean cell rate is made to be the preset mean cell rate (S 36).

Subsequently, the amount (restriction value of permissible mean cell rate/minimum mean cell rate) is subtracted from M, and the result is made to be L (S 37).

When L is determined, a restriction value of peak cell rate is made to be equal to 1/L of the preset permissible peak cell rate (S 38).

When all the restriction values are determined, the restriction values are written to the RM cell, and asks for transmission of the RM cell through the RM interface 148 (S 39).

After asking for the RM cell transmission, returns to wait for adaptive control interrupt (S 40).

2. ATM-TA
(1) Configuration

Figure 12:
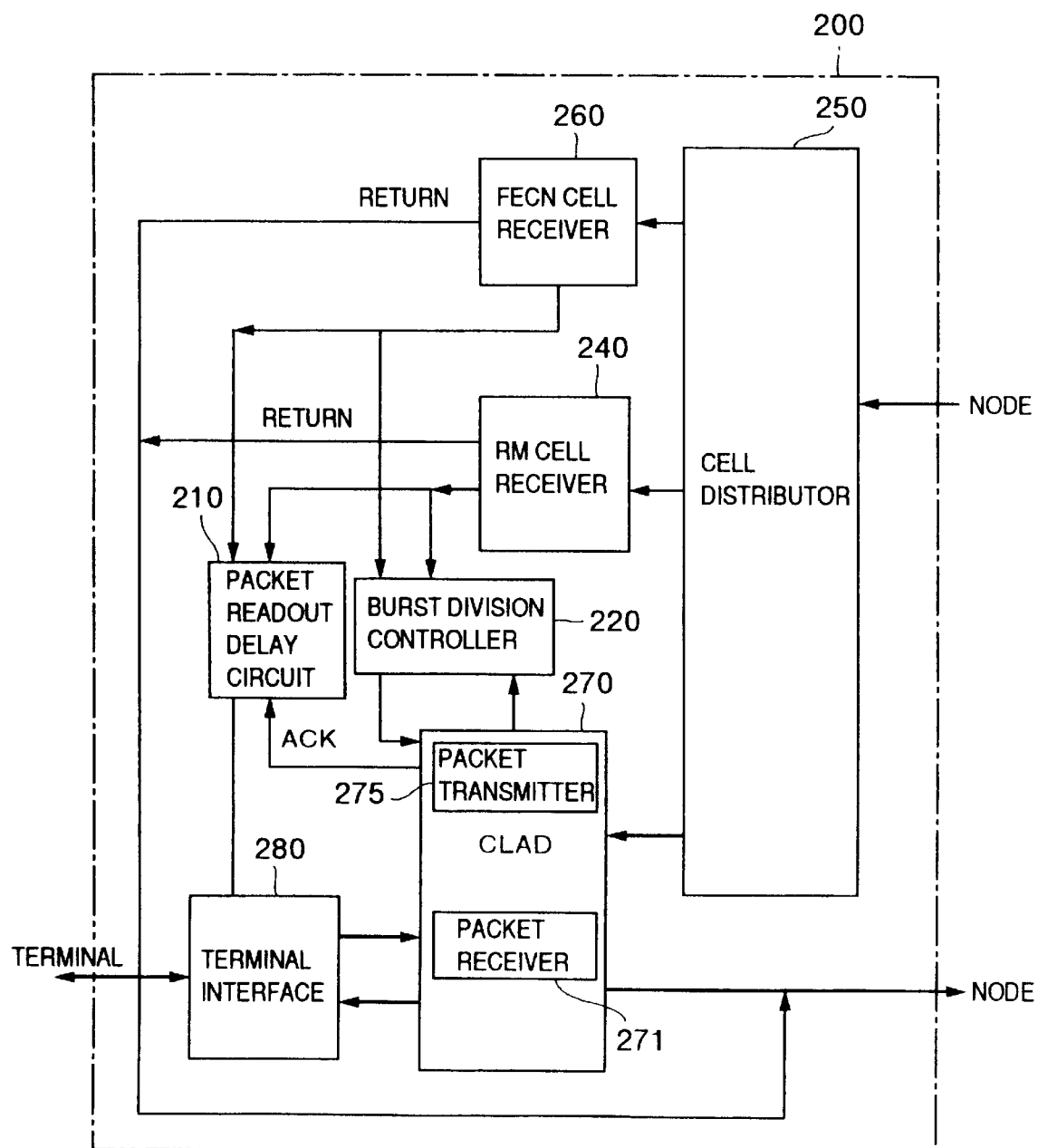
FIG. 12 is a diagram showing a configuration of a network connecting apparatus (ATM-TA) in the ATM network.

FIG. 12 shows an example of configuration of the ATM-TA 200 which forms a packet from the packet terminal 201 into cells, and sends the cells to the ATM network 6.

The ATM-TA 200 is constituted by packet readout delay circuit 210, a burst division controller 220, an RM cell receiver 240, a cell (message) distributor 250, an FECN cell receiver 260, a CLAD 270, a terminal interface 280, an ATM input line, and an ATM output line.

Among these components, the CLAD 270 includes a packet receiver 271 and a packet transmitter 275. The terminal interface 280, At the time of packet inputting, sends the packet delivered from the packet terminal 201 to the CLAD 270, and at the time of packet outputting, sends the packet from the CLAD 270 to the packet terminal 201.

The cell distributor 250 discriminates the RM cell 10 and the user cell 11 from the packet sent form a node, and distributes the RM cell 10 to the RM cell receiver 240, and the user cell 11 whose congestion bit is ON to the FECN receiver 260.

Figure 13:
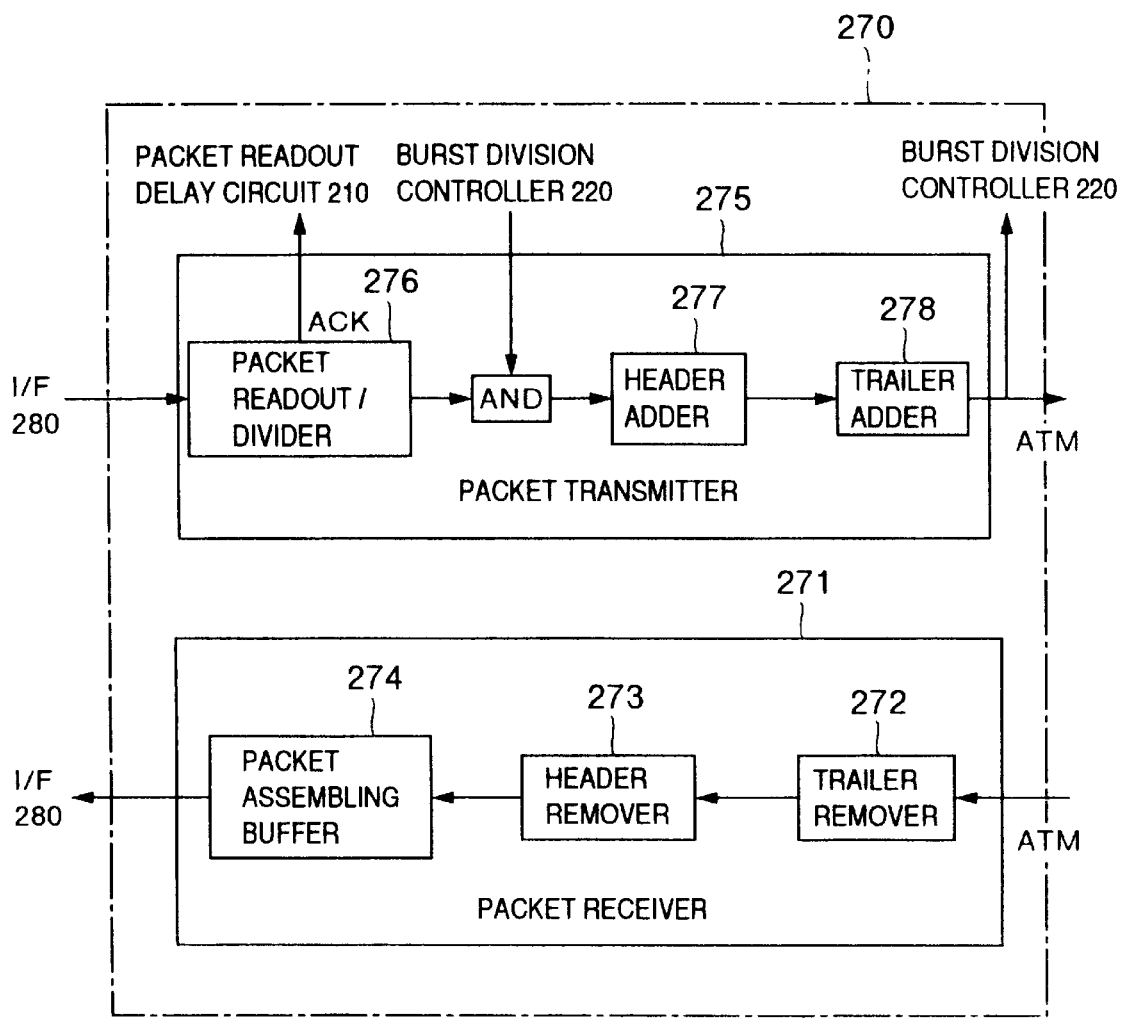
FIG. 13 is a diagram showing a configuration of a CLAD circuit in the ATM network connecting apparatus.

As shown in FIG. 13, the CLAD 270 includes the packet receiver 271 having a trailer remover 272, a header remover 273, and a packet assembling buffer 274, and includes the packet transmitter 275 having a packet readout/divider 276, a header adder 277, and a trailer adder 278.

The CLAD 270, at the time of inputting with the packet, reads out the packet with the packet readout/divider 276 and divides into cells. Subsequently, on the basis of the data sent from the burst division controller 220, adds a header with the header adder 277, and then adds a trailer with the trailer adder 278 and cuts out the packet for each constant data, and sends out as cells to the ATM exchange 100 and to the burst division controller 220 of the ATM-TA 200.

Furthermore, at the time of receiving the cell, removes a trailer with the trailer remover 272 from the cell sent from the ATM network 6, and then removes a header with the header remover 273 and sends to the packet assembling buffer 274. In the packet assembling buffer 274, a packet is assembled from a predetermined number of cells.

The assembled packet is sent out through the terminal interface 280 to the packet terminal 201.

The configuration of the burst division controller 220 will be explained.

Figure 14:
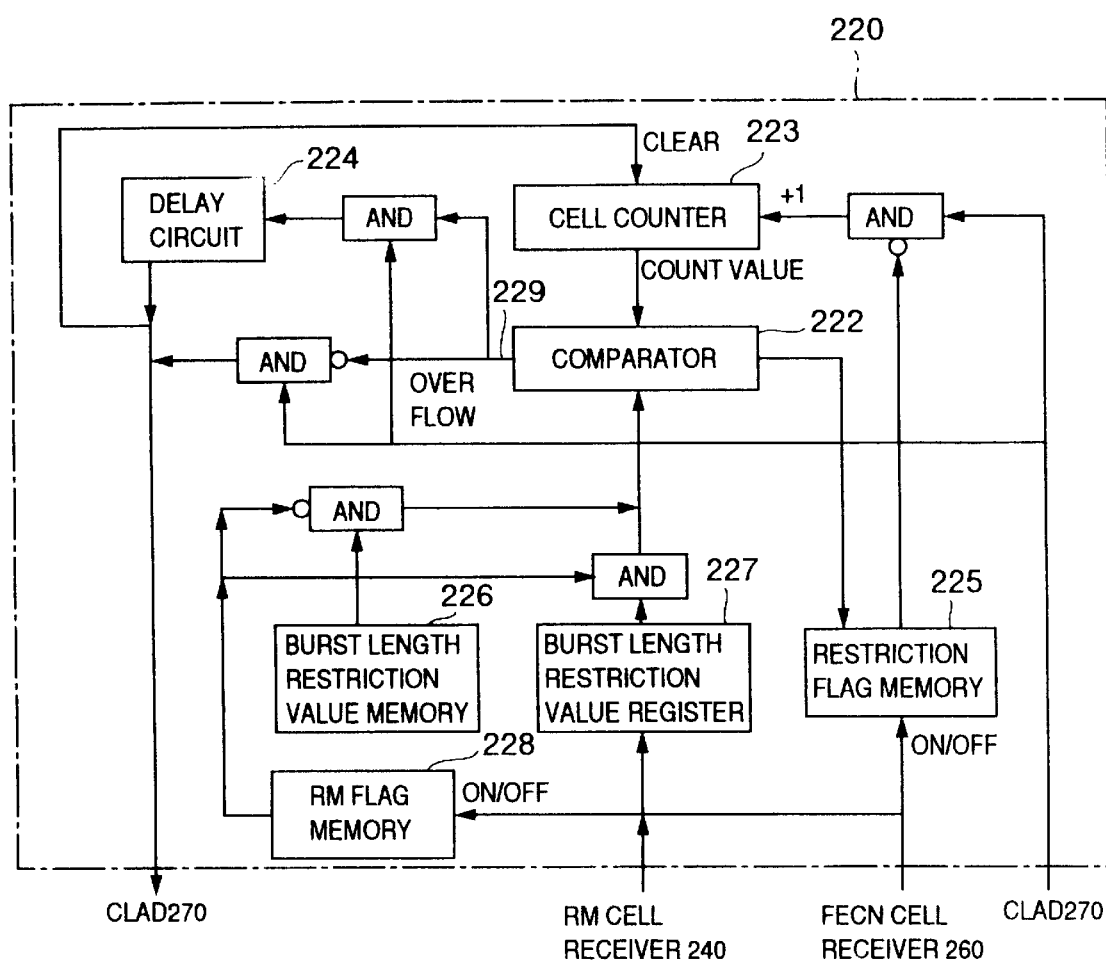
FIG. 14 is a diagram showing a configuration of a burst division controller for controlling a burst length.

As shown in FIG. 14, the burst division controller 220 performs the sending of cells intermittently to the ATM network 6, and controls the burst length. The burst division controller 220 is constituted by a burst length comparator 222, a cell counter 223, delay circuit 224, a restriction flag memory 225, a burst length restriction value memory 226, a burst length restriction value register 227, and an RM flag memory 228.

The configuration of the packet readout delay circuit 210 will be explained.

Figure 15:
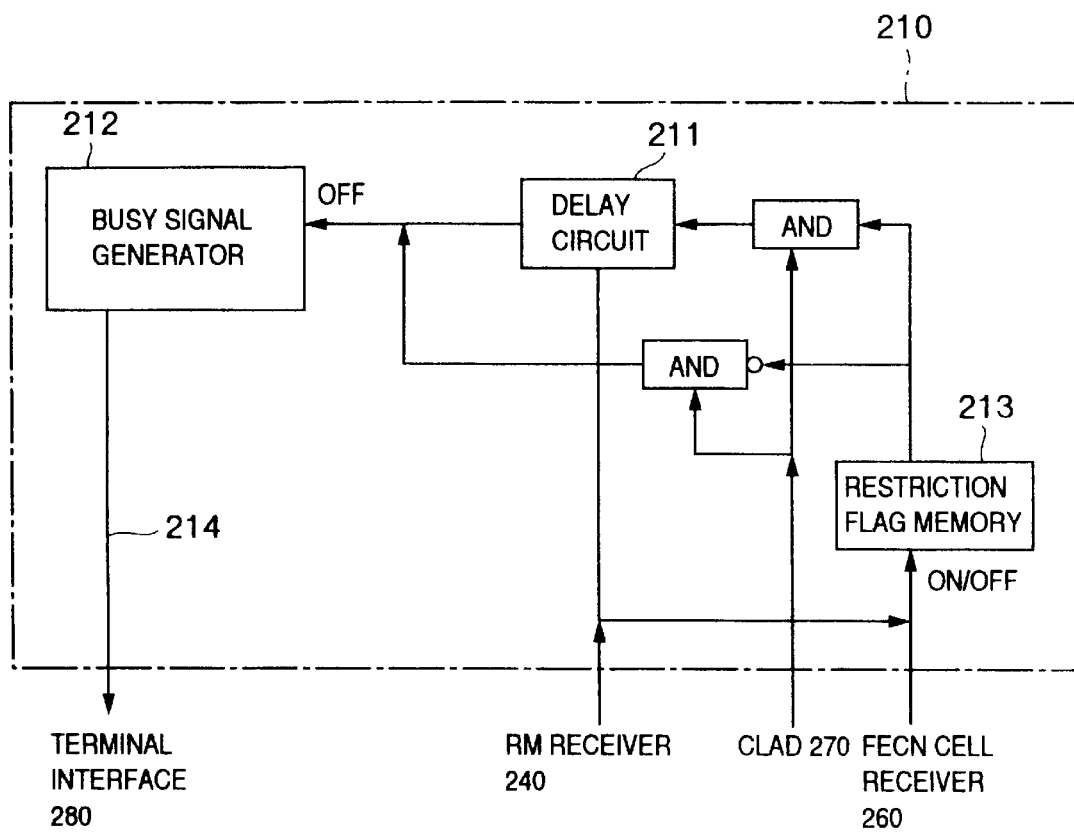
FIG. 15 is a diagram showing a configuration of a packet readout delay circuit for controlling a mean cell rate.

As shown on FIG. 15, the packet readout delay circuit 210 has a function of controlling the mean cell rate by delaying the readout of the packet from the pack terminal 201. The packet readout delay circuit 210 is constituted by a delay circuit 211, a busy signal generator 212, and a restriction flag memory 213.

(2) Operation

In FIG. 12, when the ATM-TA 200 receives the RM cell 10, the RM cell 10 is inputted to the RM cell receiver 240 through the cell distributor 250.

The RM cell receiver 240 inputted with the RM cell 10, judges on the basis of address information whether the RM cell is addressed to its own ATM-TA 200, or the RM cell is to be returned.

As a result of the judgement, when the RM cell is to be returned, the RM cell is returned to the network 6.

As the result of the judgement, when the RM cell is addressed to its own ATM-TA 200, a value of burst length written in the RM cell is read, and it is written to the burst length restriction value register 227 of the burst division controller 220.

Then, the RM receiver 240 reads a value of mean cell rate written in the RM cell 10, and calculates a burst interval corresponding to the value of mean cell rate and the value of burst length, and writes to the delay circuit 224 of the burst division controller 220. Furthermore, turns ON the restriction flag memory 225, and activates the burst division controller 220. At this time, the RM flag memory 228 is turned ON, and indicates that the traffic is being restricted by the RM cell.

Also, the burst interval is written to the delay circuit 211 of the packet readout delay circuit 210 (FIG. 15), and the restriction flag memory 213 is turned ON and the packet readout delay circuit 210 is activated.

Furthermore, the RM receiver 240 reads a value of peak cell rate written in the RM cell 10, and passes the value to the CLAD 270.

When the ATM-TA 200 receives the FECN cell 11 whose congestion bit is ON, the FECN cell 11 is inputted to the FECN receiver 260 through the cell distributor 250.

The FECN cell receiver 260 inputted with the FECN cell 11, judges on the basis of address information written in the FECN cell 11 whether the FECN cell is addressed to its own ATM-TA 200, or the FECN cell is to be returned.

When the FECN cell is to be returned, the FECN cell is returned to the ATM network 6. When the FECN cell is addressed to its own ATM-TA 200, the FECN cell receiver 260 turns ON the restriction flag memory 225 of the burst division controller 220, and activates the burst division controller 220, and further, turns ON the restriction flag memory 213 of the packet readout delay circuit 210 and activates the packet readout delay circuit 210.

The operation of the burst division controller 220 will be described in detail with reference to FIG. 14.

When the restriction flag memory 225 is OFF state, a cell send-out completion signal from the CLAD 270 is fed back as it is as a next cell cutout admission signal to the CLAD 270.

When the restriction flag memory 225 becomes ON state, each time the cell send-out completion signal from the CLAD 270 becomes ON, the cell counter 223 counts up by "+1". When a value of the cell counter 223 is updated, a count value of the cell counter 223 is inputted to the burst length comparator 222.

When the count value of the cell counter 223 is inputted, the burst length comparator 222, if the RM flag memory 228 is in ON state, compares the inputted count value with a restriction value of the burst length restriction value register 227. If the RM flag memory 228 is in OFF state, compares the inputted count value with a restriction value of the burst length restriction value memory 226.

When the value of the cell counter 223 is larger than the compared value, a burst length restriction signal 229 from the comparator 222 is changed from ON state to OFF state. However, when the value of the cell counter 223 is not larger than the compared value, the burst length restriction signal 229 is made to remain in OFF state.

When the burst length restriction signal 229 is in OFF state, the cell send-out completion signal from the CLAD 270 is fed back as it is as a next cell cutout admission signal to the CLAD 270. When the burst length restriction signal 229 is in ON state, it is changed over so that the cell send-out completion signal from the CLAD 270 is passed via the delay circuit 224 and fed back, after clearing the value of the cell counter 223 to zero, to the CLAD 270 as a next cell cutout admission signal.

Then, even if the cell send-out completion signal is changed from OFF state to ON state, since the send out of cells from the CLAD 270 is stopped for a time period corresponding to the time delay, the burst length in the ATM network 6 is reduced.

The operation of the packet readout delay circuit 210 will be described in detail with reference to FIG. 15.

The packet readout delay circuit 210, when the restriction flag memory 213 is OFF state, if a packet write admission signal is inputted from the CLAD 270, stops a busy signal 214 which has been supplied to the terminal interface 280.

On the other hand, when the restriction flag memory 213 is ON state, the packet write admission signal from the CLAD 270 is made to pass through the delay circuit 211, and thus, the busy signal 214 which has been supplied to the terminal interface 280 is delayed for a predetermined time period and then stopped. Thus, even when the packet write admission signal is changed from OFF state to ON state, a packet arrival interval from the packet terminal 201 is increased by the amount of busy signals which are sent during a time period corresponding to the time delay, and the mean cell rate is reduced.

III. Embodiment 2

A second embodiment of the present invention will be described. In the first embodiment, the present invention is applied to the exchange which supports the ABR service which restricts the flow-in traffic by performing the feedback control on the terminal when the congestion occurs, whereas in the second embodiment, instead of performing the feedback control on the terminal, the present invention is applied to the exchange which restricts the flow-in traffic by discarding the cells of traffic of a large burden by a UPC (Usage Parameter Control) at the incomming side of the exchange.

1. ATM Exchange (1) Configuration

Figure 18:
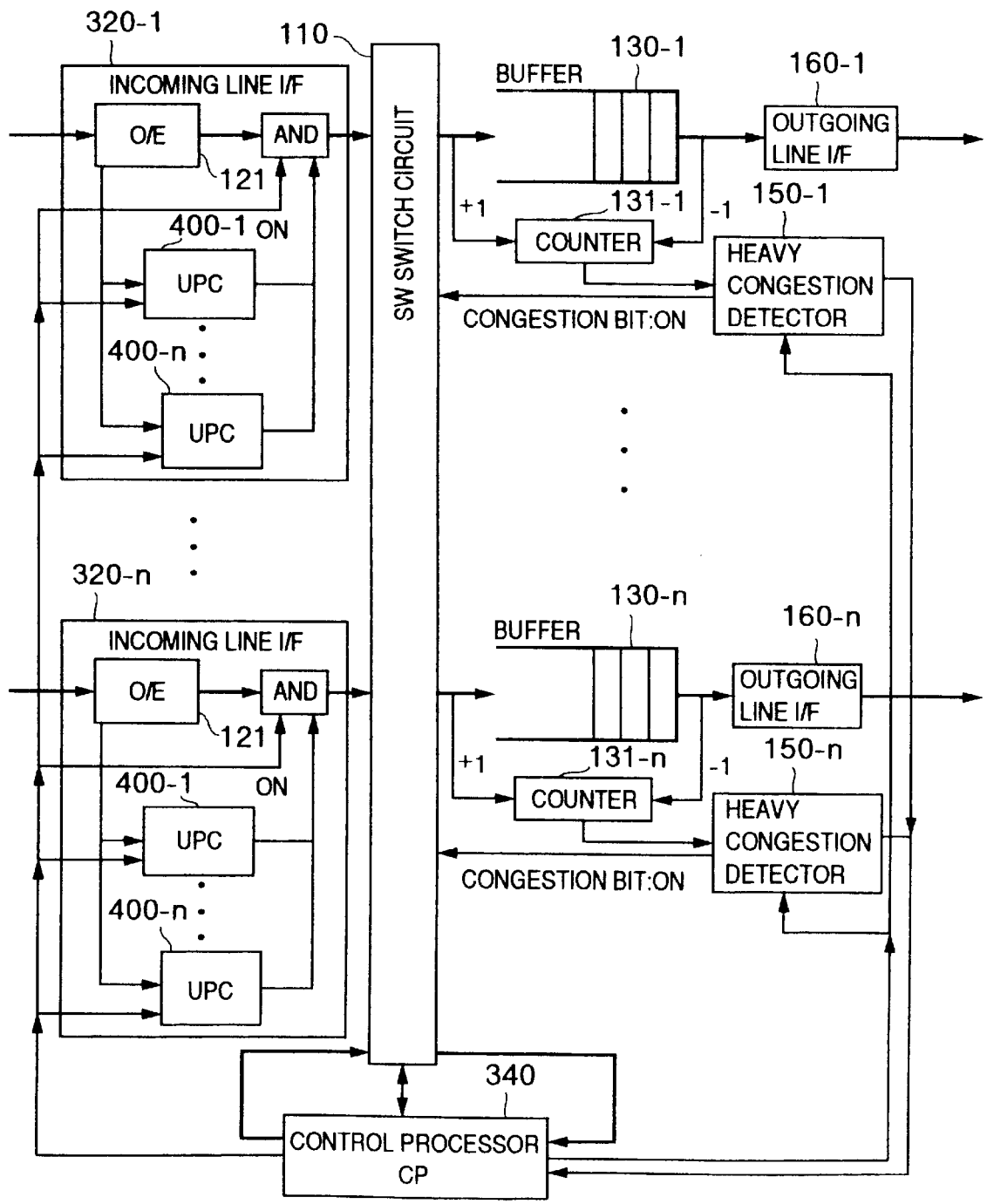
FIG. 18 is a diagram showing a configuration of an ATM exchange in which the present invention is applied to a UPC.

An ATM exchange 300 in the present embodiment is shown in FIG. 18.

The ATM exchange 300 which performs statistical multiplexing is constituted by a switch circuit (SW) 110, a plurality of buffer queues 130-1 to 130-n, a plurality of queue length counters 131-1 to 131-n for observing a queue length of cells in the buffer 130, a plurality of heavy congestion detectors 150-1 to 150-n for judging whether the congestion occurred is light congestion which recovers naturally, or heavy congestion which requires feedback control, a plurality of outgoing line interfaces 160-1 to 160-n, a plurality of incomming line interfaces 320-1 to 320-n, and a control processor (CP) 340.

Each incomming line interfaces 320 includes an opto/electric (O/E) transducer 121, and a plurality of UPCs (Usage Parameter Controllers) 400-1 to 400-n.

The SW 110 performs a switching processing for distributing cells to the buffer 130 provided for each outgoing line in accordance with a VCI (Virtual Channel Identifier). Furthermore, it has a function to rewrite a congestion bit in a header of each cell to "1".

The buffer 130 buffers the collision of cells caused by the switching processing, and sends the cells to the ATM network 6.

Figure 19:
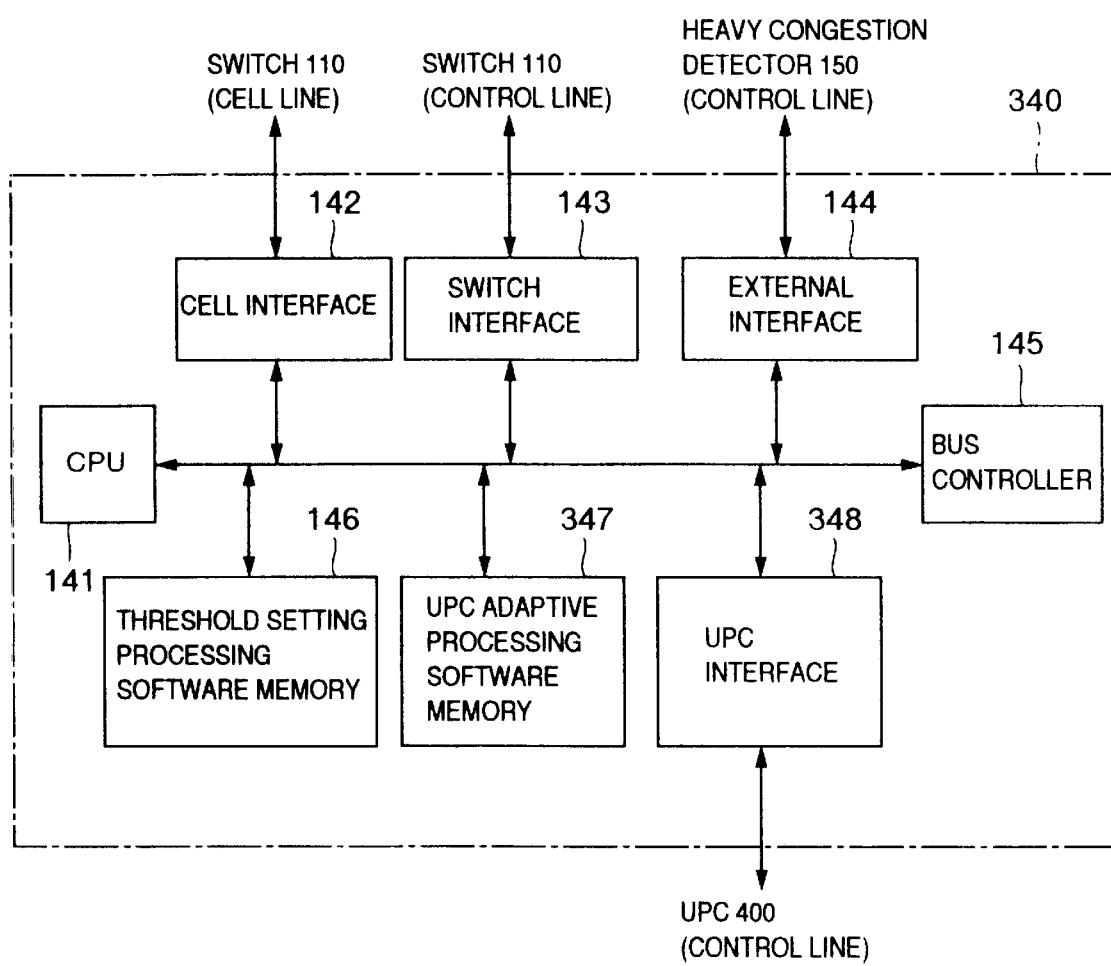
FIG. 19 is a diagram showing a configuration of a CP of the ATM exchange in which the present invention is applied to the UPC.

The CP 340, as shown in FIG. 19, includes a CPU (Central Processing Unit) 141, a cell interface 142, a switch interface 143, an external interface 144, a threshold setting processing software memory 146, a UPC adaptive processing software memory 347, and a UPC interface 348, and these circuits are coupled by a bus controlled by a bus interface controller 145.

The heavy congestion detector 150 has the same configuration as in the first embodiment shown in FIG. 11, and the explanation is omitted.

The UPCs 400 are theoretically provided the same number as the number of connected terminals, however, in practice, it is provided for each incomming line and performs processing required for the corresponding number of terminals.

Figure 20:
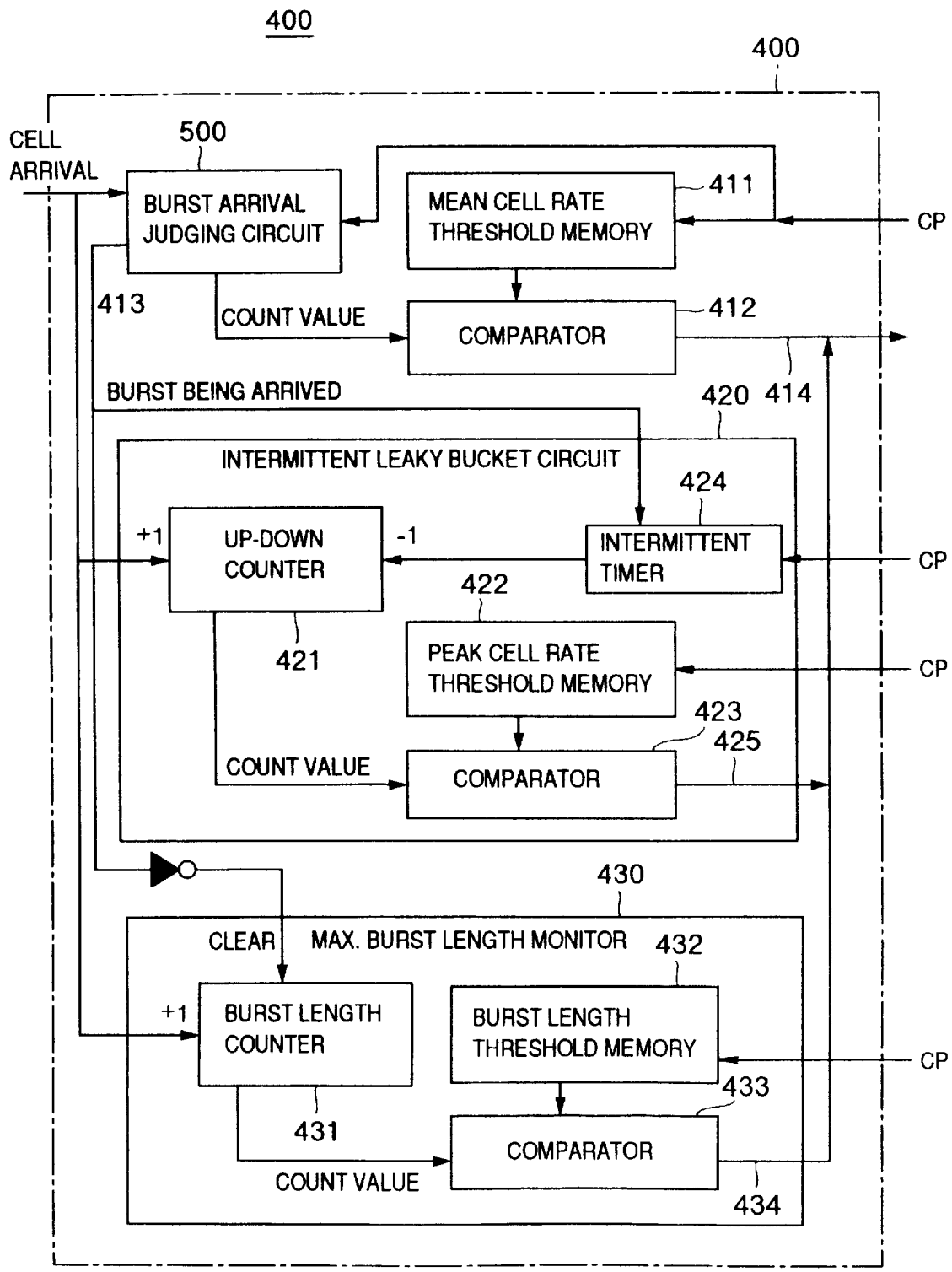
FIG. 20 is a diagram showing a configuration of a UPC.

As shown in FIG. 20, the UPC 400 is constituted by a burst arrival judging circuit 500, mean cell rate threshold memory 411, a comparator 412, an intermittent leaky bucket circuit 420, and a maximum burst length (or size) monitor 430.

The intermittent leaky bucket circuit 420 is constituted by an up-down counter 421, a peak cell rate threshold memory 422, a comparator 423, and an intermittent timer 424.

This intermittent leaky bucket circuit 420 detects that a peak cell rate becomes larger than a specified value by observing a mean cell rate in a time period from the start of a burst until the burst finishes.

The maximum burst length monitor 430 is constituted by a burst length counter 431, a burst length threshold memory 432, and a comparator 433.

This maximum burst length monitor 430 detects that a burst length becomes larger than a restriction value by accumulating the number of cells arrived in a time period from the start of a burst until the burst finishes, and by comparing the accumulated value with the restriction value of burst length.

Figure 21:
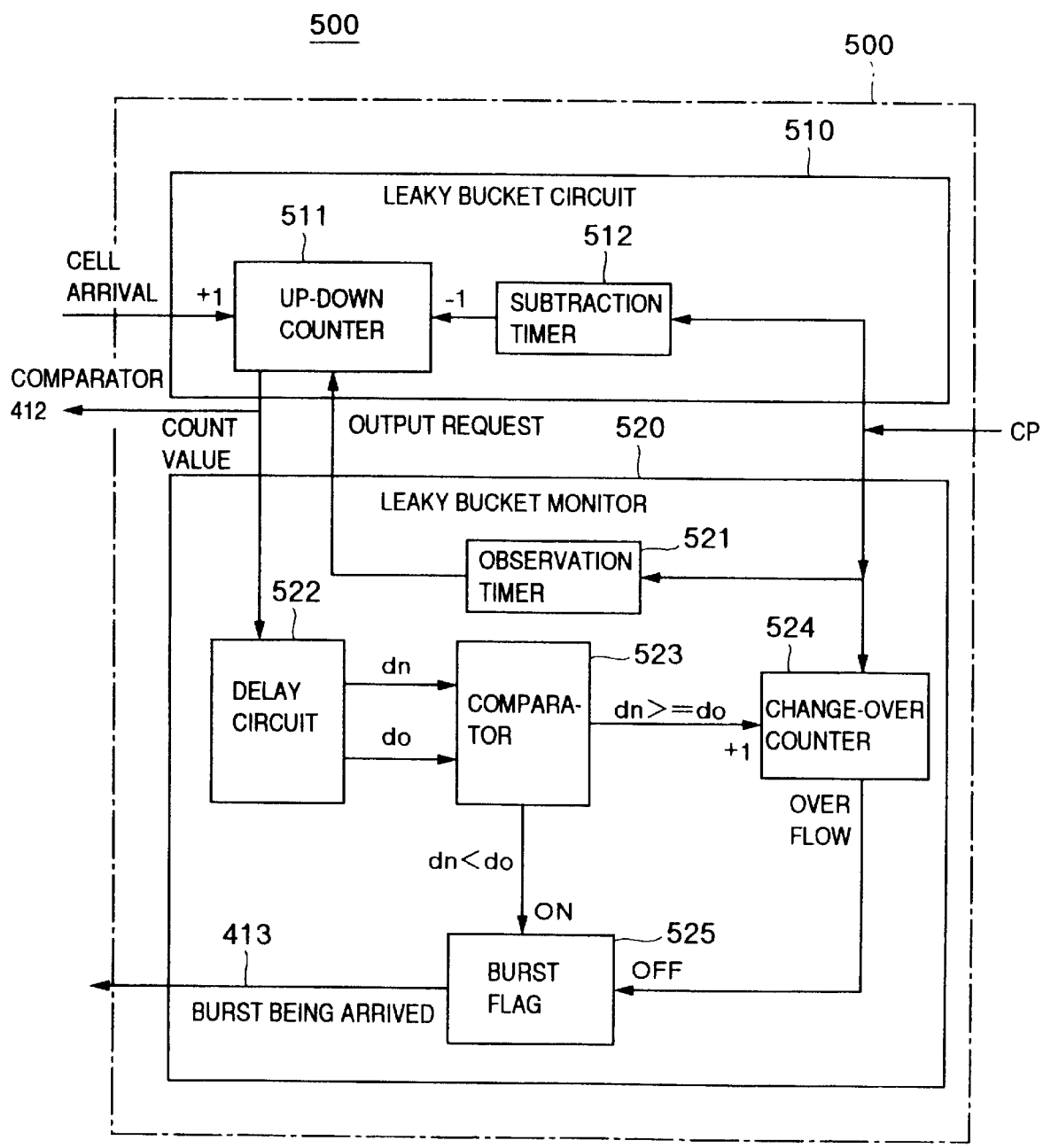
FIG. 21 is a diagram showing a burst arrival judging circuit.

The burst arrival judging circuit 500 within the UPC 400 shown in FIG. 21, with respect to a burst having an interval between cells is not constant, turns ON a burst signal 413 in synchronism with the start of the burst, and turns OFF the burst signal 413 in synchronism with the finish of the burst.

In the present embodiment, the burst arrival judging circuit 500 includes a leaky bucket circuit 510 and a leaky bucket monitor 520 which monitors an increase rate of a counter value (depth of bucket) of a leaky bucket.

The leaky bucket circuit 510 includes an up-down counter 511 and a subtraction timer 512.

The leaky bucket monitor 520 includes an observation timer 521, a delay circuit 522, a comparator 523, a change-over counter 524, and a burst flag 525.

(2) Operation

At the time of activation of the ATM exchange 300 in the present embodiment, the threshold setting processing shown in FIG. 16 is executed, and a value of the first threshold and a value of the second threshold are respectively stored in the first threshold memory 152-1 and the second threshold memory 152-2 in the heavy congestion detector 150 shown in FIG. 11.

Furthermore, a permissible time from the point of time when a queue length of cells in the buffer exceeds the first threshold until the queue length returns to the second threshold is determined, and it is stored in the permissible time memory 157.

When the cells begin to flow into the ATM exchange 300 shown in FIG. 18, the SW 110 performs a switching processing, and stores the cells in accordance with VCI in the buffer 130 provided for each outgoing line. When the cells flow into the buffer 130, the queue length counter 131 counts up by "+1" each time one cell is stored. And also counts down by "−1" each time one cell is read out.

In the heavy congestion detector 150, a count value of the queue length counter 131 is inputted each time it is changed. The heavy congestion detector 150 operates similarly as described in the Embodiment 1.

When the heavy congestion detector 150 judges that heavy congestion occurs, an adaptive control processing interrupt is requested to the CP 340. The CP 340 sends a signal to all the UPCs 400 to activate them. The SW 110 rewrites the congestion bit in a header in each cell to "1".

A UPC adaptive control processing will be explained with reference to FIG. 22.

This processing is realized by executing software stored in the UPC adaptive processing software memory 347 by the CPU 141 within the CP 340.

When the heavy congestion detector 150 requests the interrupt to the CP 140 through the external interface 144, the UPC adaptive control processing is activated (S 51).

When the UPC adaptive control processing is activated, the CP 340 reads the value of the congestion counter 158 of the heavy congestion detector 150 through the external interface 144, and substitutes its value for N (S 52).

When N is determined, the restriction value of the burst length is made to be 1/N of the preset permissible burst length (S 53).

Then, the restriction value of the burst length is compared with a preset value of minimum burst length (S 54).

When the restriction value of the burst length is larger than the value of minimum burst length, the restriction value of the burst length is written to the burst length threshold memory 432 within the UPC 400 (S 55).

Thereafter, returns to wait for UPC adaptive control interrupt (S 56).

In step 54, when the restriction value of the burst length is smaller than a value of minimum burst length, the restriction value of the burst length is made to be equal to the preset value of minimum burst length (S 57).

Next, the amount (restriction value of permissible burst length/minimum burst length) is subtracted from N, and the result is made to be M (S 58).

When M is determined, the restriction value of mean cell rate is made to be equal to 1/M of the preset permissible mean cell rate (S 59).

The restriction value of mean cell rate obtained in step S 59 is compared with a preset value of minimum mean cell rate (S 60).

When the restriction value of mean cell rate is larger than the value of minimum mean cell rate, the restriction value of mean cell rate, and the mean cell rates of all UPCs are written to the burst length threshold memory 411, and its contents are updated (S 61).

The restriction value of mean cell rate is written to the subtraction timer 512 of the leaky bucket circuit 510, and a period of the subtraction timer is updated (S 62).

After writing the restriction value, returns to wait for UPC adaptive control interrupt (S 63).

In step 60, when the restriction value of mean cell rate is smaller than a value of minimum mean cell rate, the restriction value of mean cell rate is made to be equal to a preset value of mean cell rate (S 64).

Next, The amount (permissible mean cell rate restriction value/minimum mean cell rate) is subtracted from M, and the result is made to be L (S 65).

When L is determined, the restriction value of peak cell rate is made to be equal to 1/L of the preset permissible peak cell rate (S 66).

The restriction value of peak cell rate is written to the peak cell rate memory 422 of each of all UPCs 400 (S 67).

The restriction value of mean cell rate is written to the subtraction timer 512 of the leaky bucket circuit 510, and updates a period of the subtraction timer 512 (S 68).

The restriction value of peak cell rate is written to the intermittent timer 424 within the CPU 400, and updates an intermittent timer period (S 69).

When the restriction value is written, returns to wait for UPC adaptive control interrupt (S 70).

The operation of the UPC 400 will be described.

The operation of the burst arrival judging circuit 500 within the UPC will be described with reference to FIG. 21.

In the leaky bucket circuit 510, the up-down counter 511 counts up each time a cell arrives. At the same time, the subtraction timer 512 counts down at a constant interval until the value of the up-down counter 511 becomes zero.

In the leaky bucket monitor 520, the current counter value (depth of bucket) is read out from the leaky bucket circuit 510 at a constant period, and obtains a difference from the previously read counter value (depth of bucket). At this time, the observation timer 521 outputs a readout request signal at a constant period.

When the readout request signal is outputted, the current counter value do (depth of bucket) is outputted from the up-down counter 511. When the counter value (depth of bucket) is outputted, the comparator 523 obtains the difference from the previously readout counter value dn (depth of bucket) which is stored in the delay circuit 522.

When the value obtained by subtracting the current counter value do from the previously readout counter value dn is changed to positive, the leaky bucket monitor 520 judges that a burst has arrived. At this time, the comparator 523 rewrites the burst flag 525 from "0" to "1". When the burst flag 525 is changed from "0" to "1", a burst signal 413 is changed from OFF to ON state. And at the same time, the change-over counter 524 is cleared to zero.

When the value obtained by subtracting the current counter value do from the previously readout counter value dn is successively "0" or negative for a plurality of times, the leaky bucket monitor 520 judges that the burst has finished. At this time, the comparator 523 counts up the change-over counter 524.

When the change-over counter 524 overflows a value set by the CP 340, the burst flag 525 is rewritten from "1" to "0". When the burst flag 525 is rewritten, the change-over counter 524 is cleared to zero, and the burst signal 413 is changed to OFF state.

As described above, it is possible by virtue of the series of operations of the leaky bucket circuit 510 and the leaky bucket monitor 520, for the burst wherein the interval between cells is not constant, the burst signal 413 is made to be ON state in synchronism with the start of the burst, and the burst signal 413 is made to be OFF state in synchronism with the finish of the burst.

Returning again to FIG. 20, when the counter value of the up-down counter 511 is changed, the counter value is sent to the comparator 412 from the burst arrival judging circuit 500, and the comparator 412 compares the counter value with a value in the mean cell rate threshold memory 411 within the UPC 400. When the counter value is larger than the value in the mean cell rate threshold memory 411, the UPC 400 judges that the mean cell rate exceeds the restriction value, and makes the discard signal 414 to become ON state.

The operation of the intermittent leaky bucket circuit 420 and the the maximum burst length monitor 430 within the UPC 400 will be described with reference to FIG. 20.

In the intermittent leaky bucket circuit 420, the up-down counter 421 counts up each time the cell arrives. The intermittent timer 424 counts down until the counter value becomes zero when the burst signal 413 is ON state. When the burst signal 413 is OFF state, the intermittent timer 424 does nothing.

At the same time, when the value of the up-down counter 421 is changed, the comparator 423 compares the counter value with a value of the peak cell rate threshold memory 422. When the counter value is larger than the value of the peak cell rate threshold memory 422, the intermittent leaky bucket circuit 420 judges that the peak cell rate exceeds the restriction value, and turns the discard signal 425 ON state.

In the maximum burst length monitor 430, the burst length counter 431 counts up every time the cell arrives. When the burst signal 413 is changed from ON to OFF state, the counter value of the burst length counter 431 is cleared to zero.

When the count value of the burst length counter 431 is changed, the comparator 433 compares the counter value with a value of the burst length threshold memory 432. When the counter value exceeds the value of the burst length threshold memory 432, the maximum burst length monitor 430 judges that the burst length exceeds the restriction value, and turns the discard signal 434 ON state.

When any of the discard signals 414, 425, and 434 becomes ON state, all the cells entering into a corresponding incomming line I/F 320 are discarded.

As described in the foregoing, in the present invention, when the congestion occurs in the buffer, it is judged whether the congestion is light congestion which recovers naturally, or heavy congestion which requires traffic restriction, and the traffic restriction is performed only in the case of heavy congestion. As a result, there is no wasteful overhead due to excessive traffic restriction, and the line utilization rate can be increased.

Furthermore, in the present invention, even when the congestion occurs in the buffer, the traffic control can be performed adaptively in accordance with the seriousness of the congestion.

Moreover, in the present invention, the processing time required for the traffic restriction processing is in the order of a burst interval. Accordingly, since the requirement for the response time for the traffic restriction processing is moderate, it becomes possible to operate the ABR service in a wide-area network in which the transmission time delay becomes necessarily large.

In addition, since the requirement for the response time for the traffic restriction processing is moderate, the packaging of the traffic restriction processing is easy.

We claim:

1. An ATM exchange comprising:

queue length observing means for observing a queue length of cells in a buffer;

threshold determining means for determining a first threshold and a second threshold having a value equal to the first threshold or lower;

permissible time determining means for determining a permissible time after the queue length exceeds the first threshold until the queue length returns to the second threshold;

heavy congestion judging means for judging heavy congestion by measuring a time after the queue length exceeds the first threshold until the queue length returns to the second threshold or lower, and by judging that the heavy congestion is occurring when the queue length does not return to the second threshold or lower within said permissible time; and traffic control means for performing traffic control when the occurrence of the heavy congestion is judged.

2. An ATM exchange according to claim 1, wherein said threshold determining means and said permissible time determining means calculate said first threshold, said second threshold, and said permissible time on the basis of, for permissible traffic of individual connection, a mean cell rate, a peak cell rate, a mean of burst lengths, a disperse of burst lengths, and permissible false alarm probability, and by utilizing the Green function.

3. An ATM exchange according to claim 1, wherein said heavy congestion judging means further determines seriousness of congestion represented by a value obtained by subtracting said permissible time from a time elapsed after the queue length exceeds the first threshold, and transmits the value representing the seriousness of congestion to said traffic control means, and said traffic control means performs the traffic control adaptively in accordance with the seriousness of congestion.

4. An ATM exchange according to claim 3, wherein said traffic control means determines a restriction value of the traffic on the basis of the seriousness of congestion, and asks a terminal connected to said ATM exchange for traffic restriction.

5. An ATM exchange according to claim 4, wherein said traffic control means includes at least one of burst length changing means for indicating to said terminal a change of a burst length in accordance with the seriousness of congestion, mean cell rate changing means for indicating to said terminal a change of a mean cell rate in accordance with the seriousness of congestion, and peak cell rate changing means for indicating to said terminal a change of a peak cell rate in accordance with the seriousness of congestion.

6. An ATM exchange according to claim 3, further comprising

UPC control means corresponding to a terminal connected to said ATM exchange, and wherein said traffic control means determines a restriction value of the traffic on the basis of the seriousness of congestion, and indicates to said UPC control means the restriction value of the traffic.

7. An ATM exchange according to claim 6, wherein said traffic control means includes at least one of burst length changing means for indicating to said UPC control means a change of a burst length in accordance with the seriousness of congestion, mean cell rate changing means for indicating to said UPC control means a change of a mean cell rate in accordance with the seriousness of congestion, and peak cell rate changing means for indicating to said UPC control means a change of a peak cell rate in accordance with the seriousness of congestion.

8. A traffic flow control method in an ATM exchange comprising:

an observing step of observing a queue length of cells in a buffer;

a threshold determining step of determining a first threshold and a second threshold having a value equal to the first threshold or lower;

a permissible time determining step of determining a permissible time after the queue length exceeds the first threshold until the queue length returns to the second threshold;

a heavy congestion judging step of judging heavy congestion by measuring a time elapsed after the queue length exceeds the first threshold, and by judging that the heavy congestion is occurring when the queue length does not return to the second threshold or lower within said permissible time; and a traffic control step of performing traffic control when the occurrence of the heavy congestion is judged.

9. A traffic flow control method according to claim 8, wherein said threshold determining step and said permissible time determining step include a step of inputting, for permissible traffic of individual connection, a mean cell rate, a peak cell rate, a mean of burst lengths, a disperse of burst lengths, and permissible false alarm probability, and a step of calculating said first threshold, said second threshold, and said permissible time on the basis of, for the permissible traffic of individual connection, the mean cell rate, the peak cell rate, the mean of burst lengths, the disperse of burst lengths, and the permissible false alarm probability, and by utilizing the Green function.

* * * * *

UNITED STATES PATENT AND TRADEMARK OFFICE
CERTIFICATE OF CORRECTION

Page 1 of 4

PATENT NO. : 5,914,936
DATED : June 22, 1999
INVENTOR(S) : Atsuo Hatono, et al.

It is certified that error appears in the above-identified patent and that said Letters Patent is hereby corrected as shown below:

On title page, Item [57],

In the Abstract, line 8: After "when" delete "the" (second occurrence).

| Column | Line | |
|---|---|---|
| 1 | 19 | Before "prior" change "an" to --a--. |
| 1 | 20 | Change "describe" to --described--. |
| 1 | 55 | Change "similarly" to --Similarly--. |
| 1 | 66 | Change "correspond" to --corresponds--. |
| 3 | 56 | After "congestion" insert --that occurred--; after "queue" delete "occurred". |
| 3 | 64 | Delete "the seriousness of" and insert --serious--. |
| 4 | 32 | Before "outgoing" change "a" to --an--. |

UNITED STATES PATENT AND TRADEMARK OFFICE
CERTIFICATE OF CORRECTION

PATENT NO. : 5,914,936
DATED : June 22, 1999
INVENTOR(S) : Atsuo Hatono, et al.

It is certified that error appears in the above-identified patent and that said Letters Patent is hereby corrected as shown below:

| Column | Line | |
|---|---|---|
| 5 | 66 | Change "unable" to --impossible--. |
| 6 | 18 | Change "$P_s$" to --$p_s$-- (two occurrences). |
| 6 | 20 | Change "$P_s$" to --$p_s$-- |
| 7 | 5 | Change equation 6 to read: |

$$-\frac{\partial y_L}{\partial t} + v_L \frac{\partial y_L}{\partial x} = -\varepsilon y_L + \eta y_s$$

$$-\frac{\partial y_s}{\partial t} - v_s \frac{\partial y_s}{\partial x} = \varepsilon y_L - \eta y_s \qquad \text{(equation 6)}$$

| Column | Line | |
|---|---|---|
| 7 | 51 | After "Ogura" insert --:--. |
| 8 | 34 | Change "equation 11 to (equation 14)" to --equations 11 to 14--. |
| 9 | 25 | Change "$v_L = \Sigma v_i - v$" to --$v_L = \Sigma v_i - V$--. |

UNITED STATES PATENT AND TRADEMARK OFFICE
CERTIFICATE OF CORRECTION

PATENT NO. : 5,914,936
DATED : June 22, 1999
INVENTOR(S) : Atsuo Hatono, et al.

It is certified that error appears in the above-identified patent and that said Letters Patent is hereby corrected as shown below:

| Column | Line | |
|---|---|---|
| 9 | 26 | Change "$v_s=v$" to --$v_s=V$--. |
| 9 | 34 | Change "$\eta=\mu\Sigma<v>$" to --$\eta=\mu\Sigma\langle v\rangle$--. |
| 9 | 64 | Change "$a=(\Sigma<v_i>)/v$" to --$a=(\Sigma\langle v_i\rangle)/v$--. |
| 10 | 30 | Change "$\Sigma<v_i>$" to --$\Sigma\langle v_i\rangle$--. |
| 10 | 34 | Change "$<v_i>$" to --$\langle v_i\rangle$--. |
| 10 | 51 | Change "an source" to --a source--. |
| 10 | 54 | Delete "into". |
| 11 | 62 | Change "CP) 140" to --CP 140--. |
| 12 | 27 | Change "VCI" to --VCI #--. |
| 12 | 64 | After "and" delete "the" (second occurrence). |
| 12 | 67 | Change "$<v_i>$" to --$\langle v_i\rangle$--. |

UNITED STATES PATENT AND TRADEMARK OFFICE
CERTIFICATE OF CORRECTION

PATENT NO. : 5,914,936
DATED : June 22, 1999
INVENTOR(S) : Atsuo Hatono, et al.

It is certified that error appears in the above-identified patent and that said Letters Patent is hereby corrected as shown below:

| Column | Line | |
|--------|------|---|
| 13 | 64 | Delete "equation" (second occurrence). |
| 14 | 34 | Change "occurred" to --prompted--. |
| 15 | 44 | Change "At" to --at--. |
| 15 | 49 | Change "form" to --from--. |
| 16 | 19 | Change "shown on" to --shown in--. |
| 18 | 19 | Change "interfaces" to --interface--. |
| 20 | 23 | Change "The" to --the--. |

Signed and Sealed this

Thirty-first Day of October, 2000

Q. TODD DICKINSON

*Attest:*

*Attesting Officer*  *Director of Patents and Trademarks*